United States Patent
Shetty et al.

(10) Patent No.: US 9,971,495 B2
(45) Date of Patent: May 15, 2018

(54) CONTEXT BASED GESTURE DELINEATION FOR USER INTERACTION IN EYES-FREE MODE

(71) Applicant: Nook Digital, LLC, New York, NY (US)

(72) Inventors: Saj Shetty, Fremont, CA (US); Krishanu Chattopadhyay, Sunnyvale, CA (US); Douglas Klein, Los Altos Hills, CA (US)

(73) Assignee: Nook Digital, LLC, New York, NY (US)

( * ) Notice: Subject to any disclaimer, the term of this patent is extended or adjusted under 35 U.S.C. 154(b) by 151 days.

(21) Appl. No.: 13/751,951

(22) Filed: Jan. 28, 2013

(65) Prior Publication Data

US 2014/0215340 A1 Jul. 31, 2014

(51) Int. Cl.
*G06F 3/00* (2006.01)
*G06F 3/0488* (2013.01)
(Continued)

(52) U.S. Cl.
CPC ............ *G06F 3/0488* (2013.01); *G06F 3/016* (2013.01); *G06F 3/0482* (2013.01);
(Continued)

(58) Field of Classification Search
CPC ...... G06F 3/048; G06F 3/0482; G06F 3/0483; G06F 3/0488
(Continued)

(56) References Cited

U.S. PATENT DOCUMENTS 4,896,543 A 1/1990 Gullman
5,485,197 A * 1/1996 Hoarty ................ G06F 3/04815
345/649

(Continued)

FOREIGN PATENT DOCUMENTS

EP 0722150 A1 7/1996
WO 2012170745 A2 12/2012

OTHER PUBLICATIONS

Chattopadhyay, et al., U.S. Appl. No. 13/751,954, filed Jan. 28, 2013, entitled "Gesture Based User Interface for Use in an Eyes-Free Mode."

(Continued)

*Primary Examiner* — Kieu Vu
*Assistant Examiner* — Andrew Chung
(74) *Attorney, Agent, or Firm* — Finch & Maloney PLLC

(57) ABSTRACT

Techniques are disclosed for facilitating the use of an electronic device having a user interface that is sensitive to a user's gestures. An "eyes-free" mode is provided in which the user can control the device without looking at the device display. Once the eyes-free mode is engaged, the user can control the device by performing gestures that are detected by the device, wherein a gesture is interpreted by the device without regard to a specific location where the gesture is made. The eyes-free mode can be used, for example, to look up a dictionary definition of a word in an e-book or to navigate through and select options from a hierarchical menu of settings on a tablet. The eyes-free mode advantageously allows a user to interact with the user interface in situations where the user has little or no ability to establish concentrated visual contact with the device display.

14 Claims, 18 Drawing Sheets

(51) Int. Cl.
*G06F 3/0482* (2013.01)
*G06F 3/16* (2006.01)
*G06F 3/0483* (2013.01)
*G06F 3/01* (2006.01)
*G06F 3/0484* (2013.01)
G06F 3/048 (2013.01)

(52) U.S. Cl.
CPC ........ *G06F 3/0483* (2013.01); *G06F 3/04847* (2013.01); *G06F 3/167* (2013.01); *G06F 3/048* (2013.01)

(58) Field of Classification Search
USPC ............................ 715/727–729; 51/727–729
See application file for complete search history.

(56) References Cited

U.S. PATENT DOCUMENTS

| | | | | |
|---|---|---|---|---|
| 5,633,471 | A | 5/1997 | Fukushima | |
| 5,844,557 | A | 12/1998 | Shively, II | |
| 6,259,438 | B1 | 6/2001 | Fleck et al. | |
| 6,334,157 | B1 | 12/2001 | Oppermann et al. | |
| 6,933,928 | B1* | 8/2005 | Lilienthal | 345/173 |
| 6,956,564 | B1 | 10/2005 | Williams | |
| 7,107,533 | B2* | 9/2006 | Duncan et al. | 715/727 |
| 7,649,524 | B2 | 1/2010 | Haim et al. | |
| 7,840,912 | B2 | 11/2010 | Elias et al. | |
| 7,898,541 | B2 | 3/2011 | Hong et al. | |
| 7,966,577 | B2* | 6/2011 | Chaudhri | G06F 3/0482 345/473 |
| RE42,738 | E | 9/2011 | Williams | |
| 8,059,101 | B2 | 11/2011 | Westerman et al. | |
| 8,239,413 | B2 | 8/2012 | Hubert | |
| 8,274,536 | B2 | 9/2012 | Chaudhri et al. | |
| 8,286,104 | B1 | 10/2012 | Yonge-Mallo | |
| D670,713 | S | 11/2012 | Cranfill et al. | |
| RE44,103 | E | 3/2013 | Williams | |
| 8,400,417 | B2 | 3/2013 | Ording et al. | |
| 8,452,600 | B2* | 5/2013 | Fleizach | 704/260 |
| 8,508,494 | B2 | 8/2013 | Moore | |
| 8,659,555 | B2* | 2/2014 | Pihlaja | 345/173 |
| 8,766,928 | B2 | 7/2014 | Weeldreyer | |
| 2001/0025289 | A1 | 9/2001 | Jenkins et al. | |
| 2001/0028369 | A1* | 10/2001 | Gallo | G06F 3/04815 715/848 |
| 2002/0069071 | A1* | 6/2002 | Knockeart | G06F 3/023 704/275 |
| 2002/0116421 | A1 | 8/2002 | Fox et al. | |
| 2005/0164688 | A1 | 7/2005 | Satake | |
| 2005/0216839 | A1 | 9/2005 | Salvucci | |
| 2005/0229102 | A1* | 10/2005 | Watson | G06F 3/0481 715/739 |
| 2006/0053372 | A1 | 3/2006 | Adkins et al. | |
| 2006/0067577 | A1 | 3/2006 | Marggraff et al. | |
| 2007/0047002 | A1 | 3/2007 | Hull et al. | |
| 2008/0020356 | A1 | 1/2008 | Saba | |
| 2008/0036747 | A1 | 2/2008 | Hope | |
| 2009/0064031 | A1* | 3/2009 | Bull | G06F 3/0485 715/784 |
| 2009/0094548 | A1* | 4/2009 | Nobori | G06F 3/0485 715/786 |
| 2009/0228798 | A1* | 9/2009 | Kephart et al. | 715/727 |
| 2009/0252311 | A1* | 10/2009 | Kuiken | G08C 17/00 379/102.02 |
| 2009/0295734 | A1 | 12/2009 | Hendrickson et al. | 345/169 |
| 2010/0083179 | A1* | 4/2010 | Decker | G06F 3/0483 715/830 |
| 2010/0100854 | A1 | 4/2010 | Russell et al. | |
| 2010/0192086 | A1 | 7/2010 | Kocienda et al. | |
| 2010/0229130 | A1 | 9/2010 | Edge et al. | |
| 2010/0259482 | A1 | 10/2010 | Ball | |
| 2010/0262659 | A1 | 10/2010 | Christiansen et al. | |
| 2010/0283744 | A1 | 11/2010 | Nordenhake | |
| 2010/0299638 | A1 | 11/2010 | Choi | |
| 2010/0318895 | A1 | 12/2010 | Steinberger et al. | |
| 2010/0324902 | A1* | 12/2010 | Kurzweil et al. | 704/260 |
| 2010/0328052 | A1 | 12/2010 | Pasquero et al. | |
| 2011/0010659 | A1* | 1/2011 | Kim | G06F 3/0485 715/784 |
| 2011/0050591 | A1* | 3/2011 | Kim et al. | 345/173 |
| 2011/0167350 | A1* | 7/2011 | Hoellwarth | 715/727 |
| 2011/0191675 | A1* | 8/2011 | Kauranen | G06F 3/04847 715/702 |
| 2011/0210926 | A1* | 9/2011 | Pasquero et al. | 345/173 |
| 2011/0234543 | A1* | 9/2011 | Gardenfors et al. | 345/175 |
| 2011/0258542 | A1 | 10/2011 | Kenney et al. | |
| 2011/0273379 | A1 | 11/2011 | Chen et al. | |
| 2011/0283241 | A1* | 11/2011 | Miller et al. | 715/863 |
| 2011/0304558 | A1 | 12/2011 | Pasquero et al. | |
| 2011/0307833 | A1* | 12/2011 | Dale et al. | 715/835 |
| 2011/0310026 | A1 | 12/2011 | Davis et al. | |
| 2012/0046947 | A1 | 2/2012 | Fleizach | |
| 2012/0050159 | A1* | 3/2012 | Yu et al. | 345/157 |
| 2012/0056821 | A1 | 3/2012 | Goh | |
| 2012/0084694 | A1 | 4/2012 | Sirpal et al. | |
| 2012/0084704 | A1 | 4/2012 | Lee | |
| 2012/0110517 | A1* | 5/2012 | Sparks et al. | 715/863 |
| 2012/0124505 | A1 | 5/2012 | St. Jacques, Jr. | |
| 2012/0127110 | A1 | 5/2012 | Amm et al. | |
| 2012/0139879 | A1 | 6/2012 | Kim et al. | |
| 2012/0192093 | A1 | 7/2012 | Migos et al. | |
| 2012/0192118 | A1 | 7/2012 | Migos et al. | |
| 2012/0221938 | A1 | 8/2012 | Patterson et al. | |
| 2012/0235901 | A1 | 9/2012 | Binder | |
| 2012/0235938 | A1 | 9/2012 | Laubach | |
| 2012/0240041 | A1 | 9/2012 | Lim | |
| 2012/0242579 | A1 | 9/2012 | Chua | |
| 2012/0242584 | A1 | 9/2012 | Tuli | |
| 2012/0249768 | A1 | 10/2012 | Binder | |
| 2012/0272144 | A1 | 10/2012 | Radakovitz et al. | |
| 2012/0280947 | A1 | 11/2012 | Weaver et al. | |
| 2012/0299853 | A1* | 11/2012 | Dagar | G06F 3/016 345/173 |
| 2012/0306765 | A1 | 12/2012 | Moore | |
| 2012/0306772 | A1 | 12/2012 | Tan et al. | |
| 2012/0311438 | A1 | 12/2012 | Cranfill et al. | |
| 2012/0313848 | A1 | 12/2012 | Galor et al. | |
| 2012/0324355 | A1* | 12/2012 | Mbenkum et al. | 715/727 |
| 2012/0329529 | A1 | 12/2012 | van der Raadt | |
| 2013/0016045 | A1 | 1/2013 | Zhao et al. | |
| 2013/0019263 | A1* | 1/2013 | Ferren | G06F 13/00 725/37 |
| 2013/0024820 | A1* | 1/2013 | Kirkpatrick | 715/863 |
| 2013/0036383 | A1 | 2/2013 | Yuan et al. | |
| 2013/0047115 | A1 | 2/2013 | Migos et al. | |
| 2013/0055141 | A1* | 2/2013 | Arriola et al. | 715/776 |
| 2013/0063364 | A1 | 3/2013 | Moore | |
| 2013/0073998 | A1* | 3/2013 | Migos et al. | 715/776 |
| 2013/0076632 | A1 | 3/2013 | Sirpal et al. | |
| 2013/0076637 | A1 | 3/2013 | Teltz | |
| 2013/0076638 | A1 | 3/2013 | Sirpal et al. | |
| 2013/0076781 | A1 | 3/2013 | Sirpal et al. | |
| 2013/0111407 | A1* | 5/2013 | Mullen | G06F 8/61 715/834 |
| 2013/0113699 | A1 | 5/2013 | Lim | |
| 2013/0117702 | A1* | 5/2013 | Jang et al. | 715/776 |
| 2013/0120271 | A1 | 5/2013 | Lee et al. | |
| 2013/0130216 | A1 | 5/2013 | Morton et al. | 434/317 |
| 2013/0135234 | A1 | 5/2013 | Hisano et al. | |
| 2013/0139078 | A1 | 5/2013 | Chuang et al. | |
| 2013/0139107 | A1 | 5/2013 | Jung | |
| 2013/0151955 | A1* | 6/2013 | Williams | 715/255 |
| 2013/0155094 | A1* | 6/2013 | Ahn | 345/592 |
| 2013/0159939 | A1* | 6/2013 | Krishnamurthi | 715/863 |
| 2013/0162532 | A1 | 6/2013 | Cheng et al. | |
| 2013/0185680 | A1 | 7/2013 | Chaudhri et al. | |
| 2013/0194308 | A1 | 8/2013 | Privault et al. | |
| 2013/0212454 | A1* | 8/2013 | Casey | 715/203 |
| 2013/0222274 | A1* | 8/2013 | Mori et al. | 345/173 |
| 2013/0232408 | A1* | 9/2013 | Xu | 715/256 |
| 2013/0268826 | A1* | 10/2013 | Nowakowski et al. | 715/203 |
| 2013/0304474 | A1* | 11/2013 | Conkie et al. | 704/260 |
| 2013/0328809 | A1 | 12/2013 | Smith | |

(56) References Cited

U.S. PATENT DOCUMENTS

| | | | |
|---|---|---|---|
| 2013/0332827 A1 | 12/2013 | Smith | |
| 2014/0026055 A1 | 1/2014 | Cohn et al. | |
| 2014/0123032 A1* | 5/2014 | Lanz et al. | 715/753 |
| 2014/0127667 A1* | 5/2014 | Iannacone | 434/379 |
| 2014/0142954 A1* | 5/2014 | Cameron et al. | 704/276 |
| 2014/0160035 A1* | 6/2014 | Sauer et al. | 345/173 |
| 2014/0189056 A1* | 7/2014 | St. Clair et al. | 709/217 |
| 2014/0189524 A1* | 7/2014 | Murarka et al. | 715/744 |
| 2014/0189531 A1* | 7/2014 | Murarka et al. | 715/753 |
| 2014/0189539 A1* | 7/2014 | St. Clair et al. | 715/753 |
| 2014/0215329 A1* | 7/2014 | Zilberman et al. | 715/702 |
| 2014/0223381 A1* | 8/2014 | Huang | G06F 17/30905 715/863 |
| 2014/0354594 A1 | 12/2014 | Kreutzer et al. | |

OTHER PUBLICATIONS

Klein, et al., U.S. Appl. No. 13/751,940, filed Jan. 28, 2013, entitled, "Content Navigation and Selection in an Eyes-Free Mode."

Andrew Bragdon et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", printed from www.google.com/mobile/gesture-search on Dec. 26, 2012.

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do Wacom tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

"Explaining how the sPen tech works (and is very diff than other styluses)," http://forum.xda-developers.com/showthread.php?t=, 1 page, printed from the Internet on Jan. 15, 2013.

Kanai, et al., "Intra-Rendition Navigation," Copyright 2012-2013 International Digital Publishing Forum (IDPF), 13 pages.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

(56) References Cited

OTHER PUBLICATIONS

"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Notice of Allowance received in U.S. Appl. No. 13/946,538 (mailed Jan. 19, 2017) (16 pages).
Decision on Appeal, U.S. Appl. No. 13/751,940, Patent Trial and Appeal Board Appeal 2017-000948 (sent May 2, 2017).
Decision on Appeal, U.S. Appl. No. 13/912,980, Patent Trial and Appeal Board Appeal 2017-000064 (sent Jun. 2, 2017).

\* cited by examiner

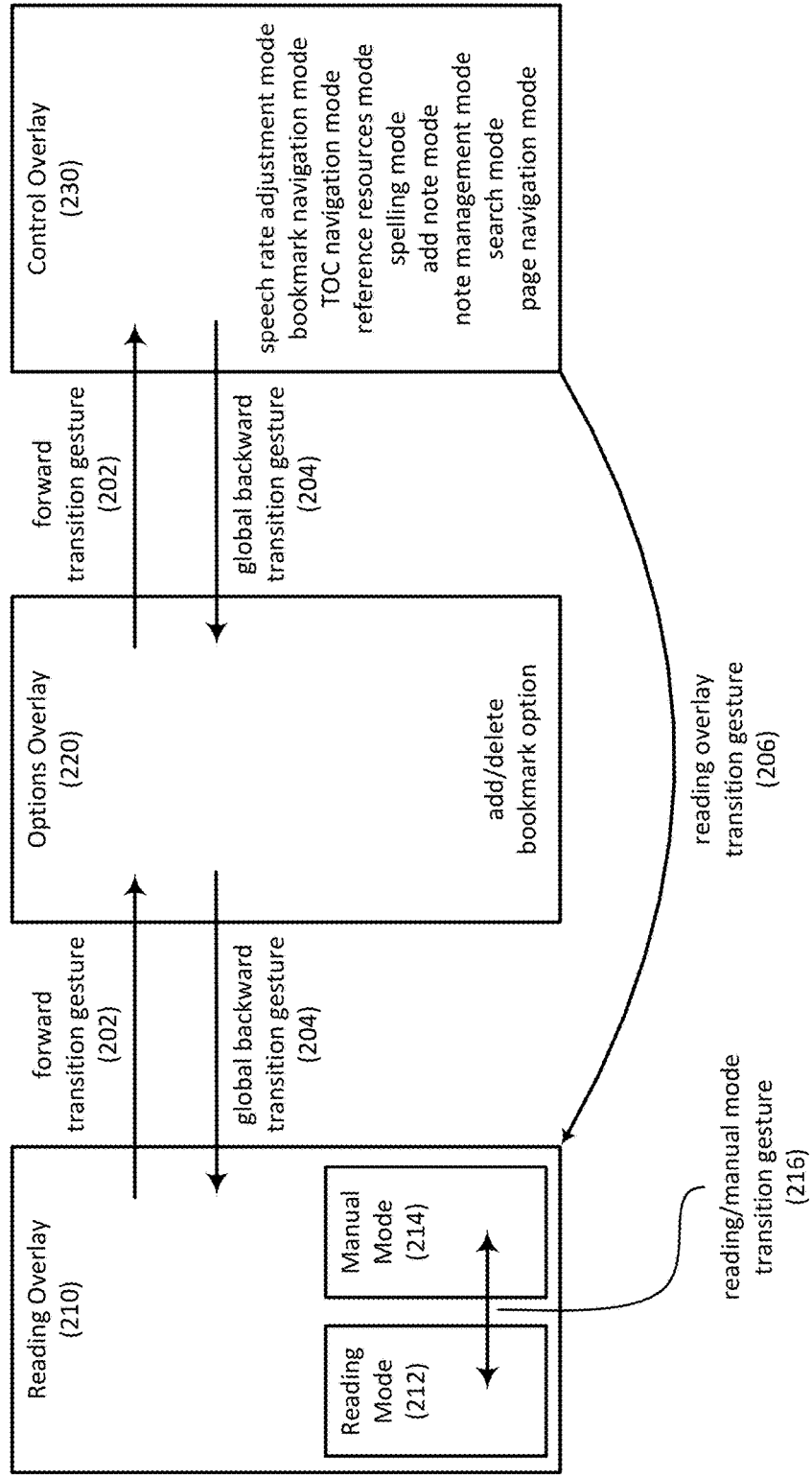

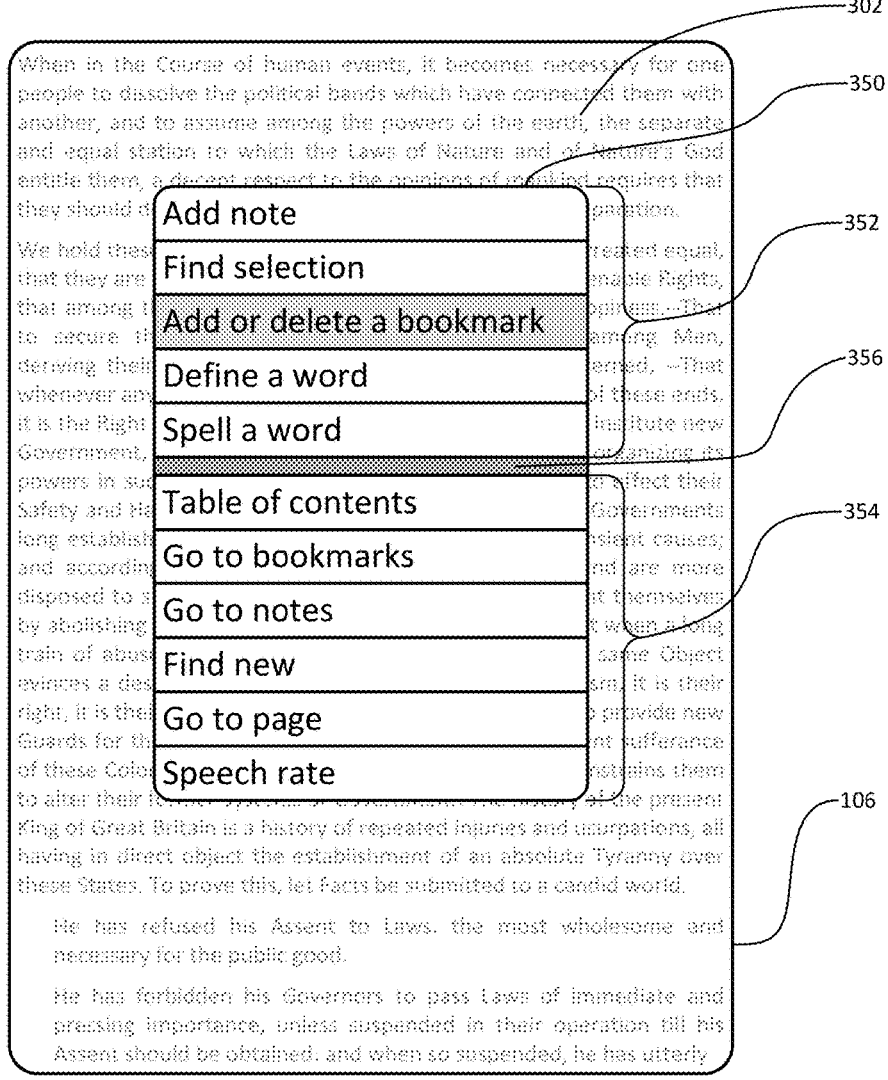

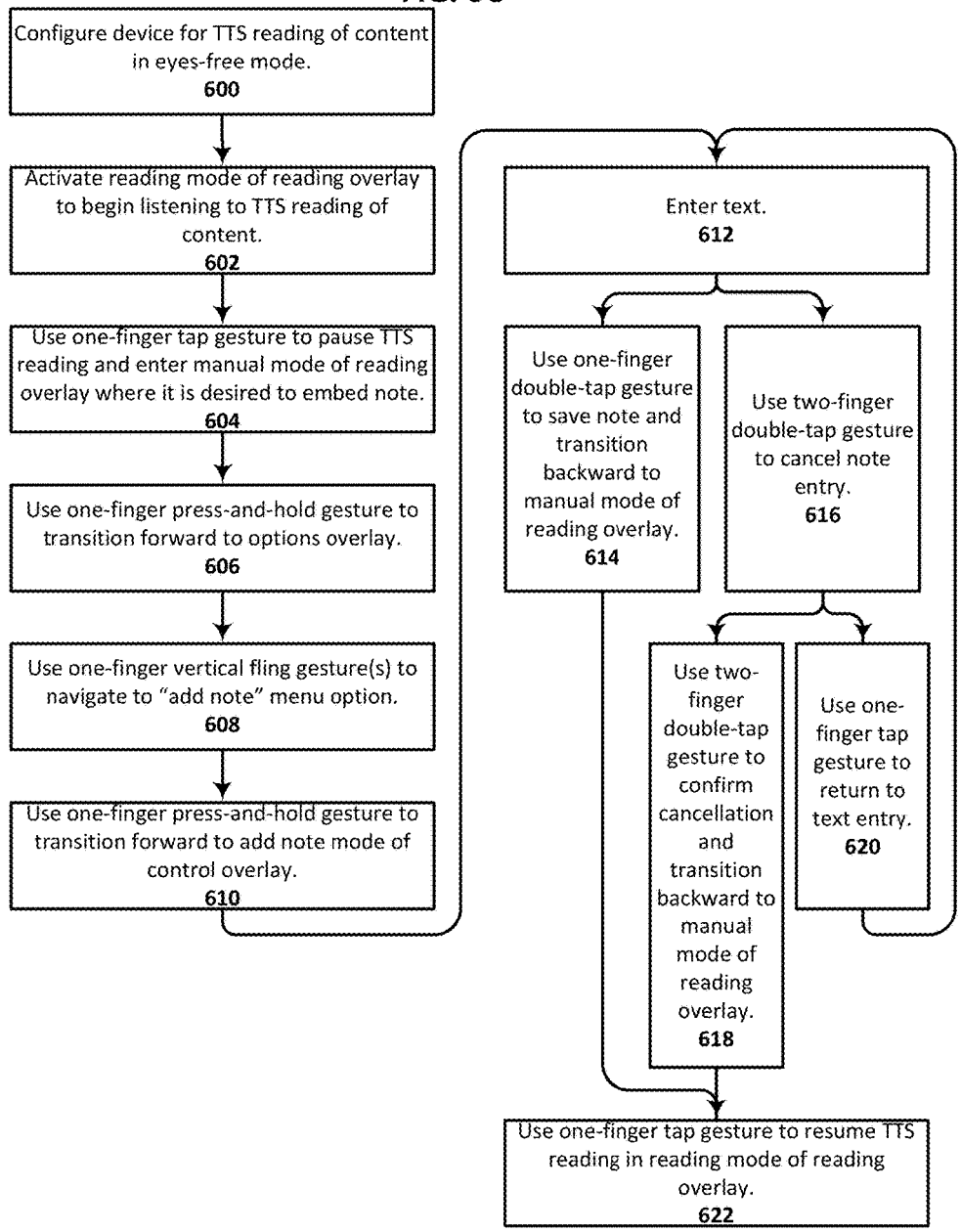

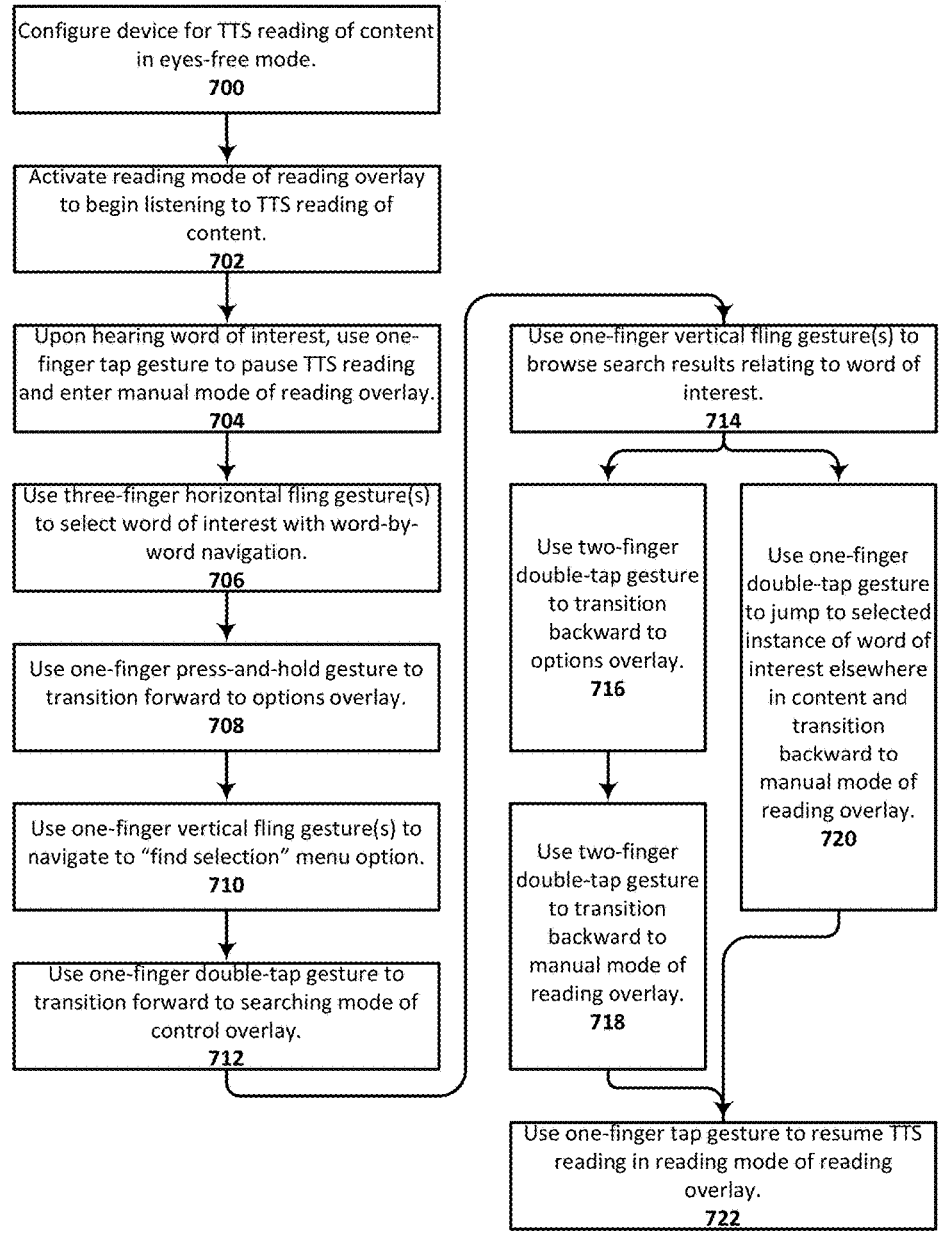

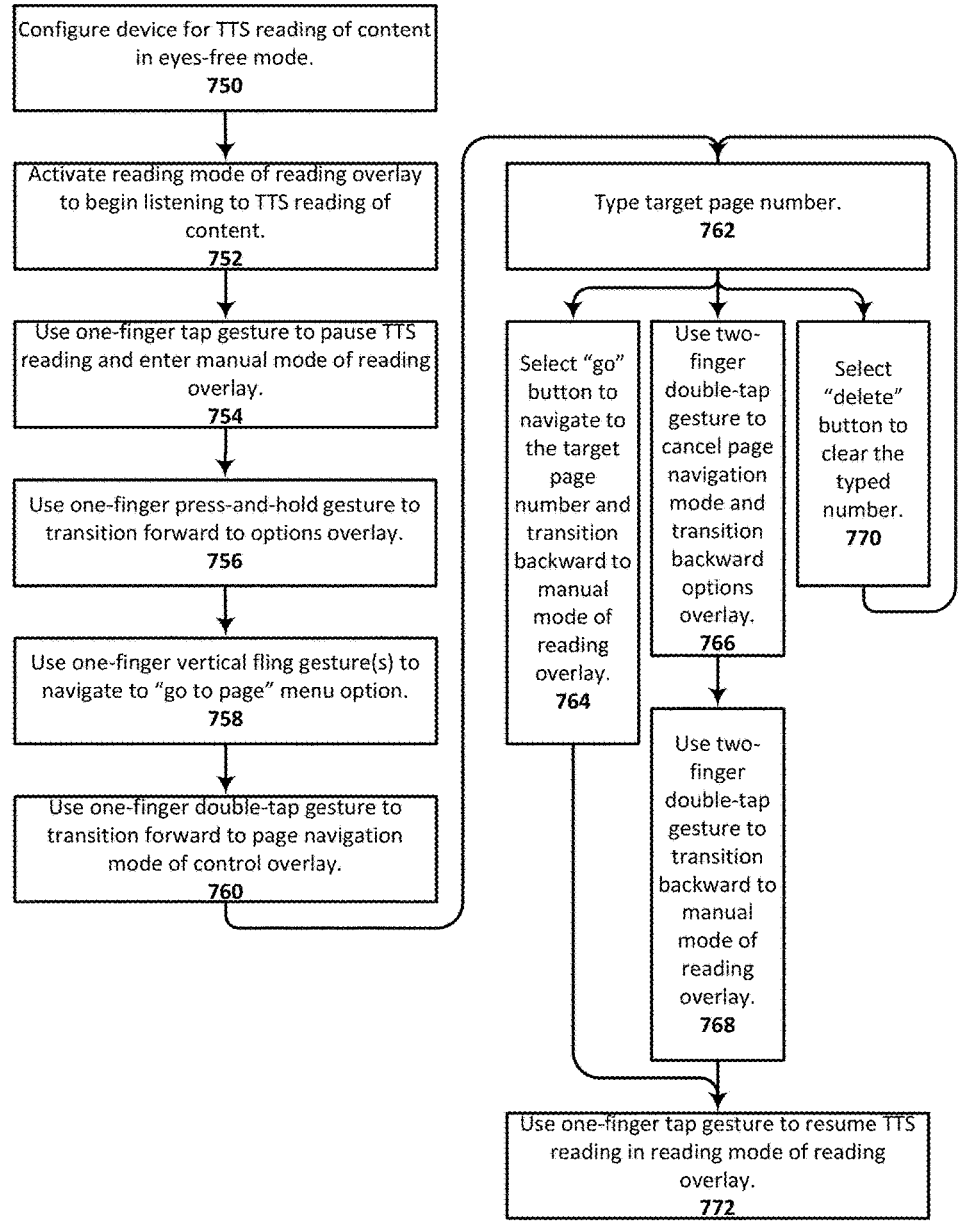

CONTEXT BASED GESTURE DELINEATION FOR USER INTERACTION IN EYES-FREE MODE

FIELD OF THE DISCLOSURE

This disclosure relates generally to electronic devices that are sensitive to a user's gestures, and more particularly, to user interface techniques for interacting with such gesture sensitive devices.

BACKGROUND

Electronic devices such as tablets, e-readers, mobile phones, smart phones and personal digital assistants (PDAs) are commonly used to provide a user with both consumable and non-consumable content. Examples of consumable content include e-books, webpages, images, videos and maps; examples of non-consumable content include menus, settings, icons, control buttons and scroll bars. Such electronic devices typically include a user interface that allows a user to interact with the device, its applications and its content. For example, the user interface may include a touch sensitive display and/or one or more displayed labels that correspond to hardware controls associated with the device. A display that is sensitive to a user's touch and that also provides information to the user is often referred to as a "touchscreen". A touchscreen may or may not be backlit, and may be implemented for instance with a light-emitting diode (LED) screen or an electrophoretic display. A touchscreen is just one example of a technology that is sensitive to the gestures of a user; other types of such technologies include touch pads that use capacitive or resistive sensors, touch sensitive housings, and motion sensing cameras.

BRIEF DESCRIPTION OF THE DRAWINGS

FIG. 3 is a schematic diagram conceptually illustrating multiple overlays and modes that can be used in an eyes-free mode, in accordance with an embodiment of the present invention.

FIG. 4B is a schematic illustration of a screenshot of the user interface of the electronic touchscreen device illustrated in FIGS. 1A-1C, wherein the screenshot displays a modified configuration of an options overlay, in accordance with an embodiment of the present invention.

FIG. 6C is a flowchart illustrating an example methodology of how an eyes-free mode is used to embed a note in content stored on an electronic device, in accordance with an embodiment of the present invention.

FIG. 6E is a flowchart illustrating an example methodology of how an eyes-free mode is used to find a word of interest in content stored on an electronic device, in accordance with an embodiment of the present invention.

FIG. 6F is a flowchart illustrating an example methodology of how an eyes-free mode is used to navigate to a target page within content stored on an electronic device, in accordance with an embodiment of the present invention.

DETAILED DESCRIPTION

Figure 1A:
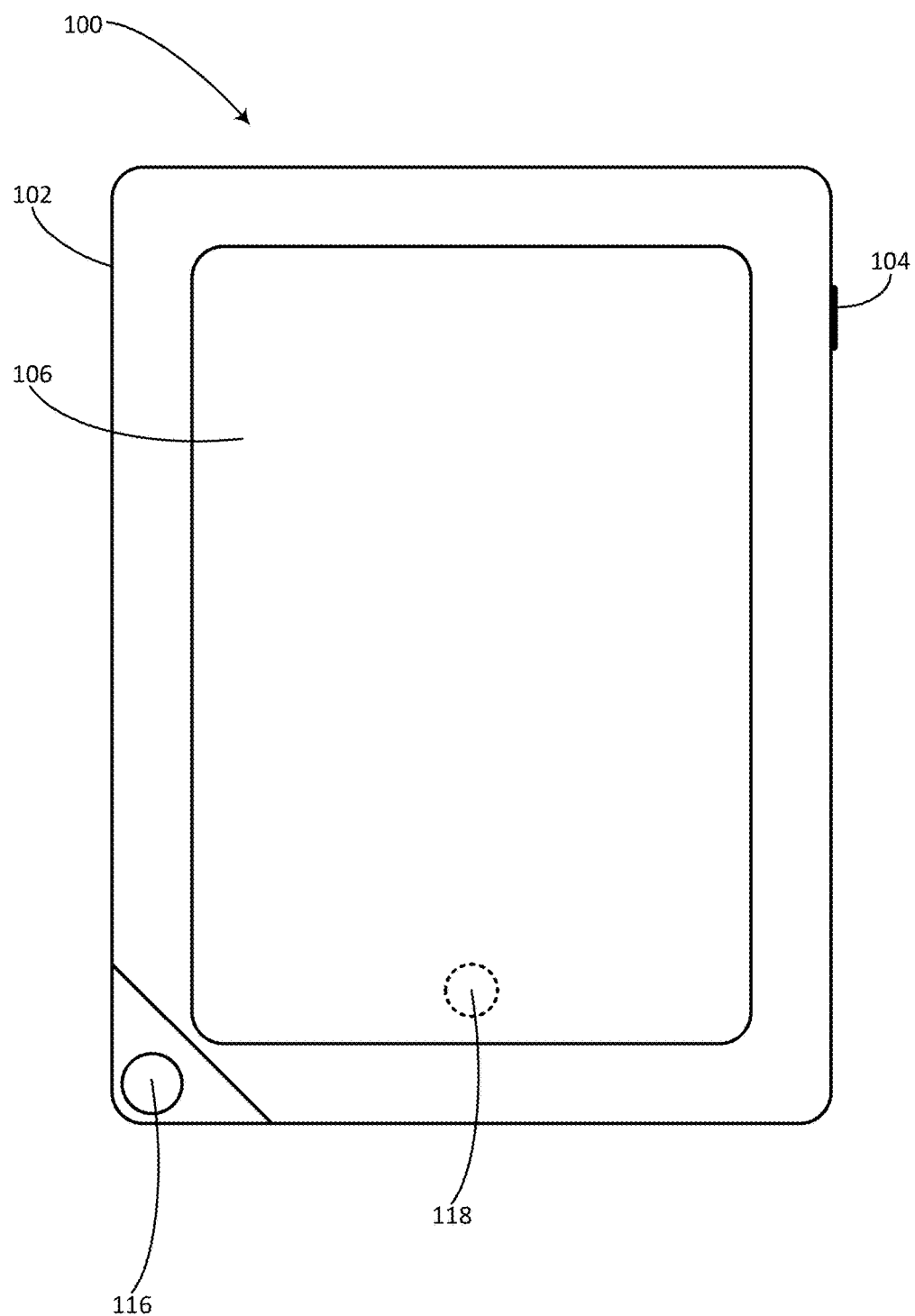
FIG. 1A is a front view of an example electronic device having a gesture-based user interface configured in accordance with an example embodiment.

Techniques are disclosed for facilitating the use of an electronic device having a user interface that is sensitive to the gestures of a user. An "eyes-free" mode is provided in which the user can control the device without actually looking at or otherwise focusing on the device display. Specifically, once the eyes-free mode is engaged, the user can control the device by performing one or more gestures that are detected by the device, wherein a gesture is interpreted by the device without regard to a specific location where the gesture is made. Examples of gestures which may be used in the eyes-free mode include a vertical swipe of one finger in view of a motion sensing camera, a horizontal swipe of two fingers across a touch pad, or a double-tap of three fingers on a touchscreen. The eyes-free mode can be used, for example, to look up a dictionary definition of a word in an e-book or to navigate through and select options from a hierarchical menu of settings on a tablet computer. The eyes-free mode advantageously allows a user to interact with the user interface in situations where the user has little or no ability to establish concentrated visual contact with the device display.

A. GENERAL OVERVIEW

As previously explained, electronic devices such as tablets, e-readers, mobile phones, smart phones and PDAs are commonly used to display a wide variety of content. Such devices often have a user interface that includes a display and a sensor capable of detecting the gestures of a user. The gesture sensor may include a touch sensitive surface, a motion sensing camera, an accelerometer or another technology capable of sensing the gestures of a user. For example, in a touchscreen device, a display and a touch sensitive surface are integrated into a single component. Other devices may include a touch pad that is physically separated from the display. However, regardless of the particular configuration of the display and the gesture sensor, the user interface allows the user to respond to and interact with information provided on the display. In some cases, such interaction is accomplished by gesturing in a way that manipulates a pointer, cursor or other indicator shown on the display. The gestures may be provided by the user's fingers or any other suitable implement, such as a stylus.

While user interfaces that are sensitive to a user's gestures provide a convenient way for a user to interact with an electronic device, there are certain disadvantages associated with this technology. For instance, devices that are designed to respond to a user's gestures can be susceptible to detecting and responding to accidental or unintentional gestures. Conventional user interfaces also generally require a user to coordinate his or her gesture with information provided on a display screen which necessitates a degree of user concentration or focus. For example, selecting a menu item provided on a touchscreen has previously involved the two-step process of (a) gesturing in a way that locates a pointer, cursor or other indicator at the desired menu item and (b) selecting the desired menu item by clicking, tapping or the like. While this locate-and-select technique works well when the user can easily focus on the display, it can be problematic when establishing visual contact with the display is inconvenient, difficult or impossible.

Some e-readers include a text-to-speech (TTS) feature that allows a user to have the content of an e-book read aloud. This is useful when the user cannot or does not want to direct his or her visual attention to the e-reader, but still wishes to consume the e-book content. E-readers also often include a word definition feature that allows a user to obtain a dictionary definition of a selected word. Conventionally the word definition feature is accessed by selecting a word in the text and performing an action that accesses the word definition feature. In a situation where the TTS feature is being used to consume the e-book content, accessing the word definition feature still requires the user to look at the display to select the word of interest and access the definition feature. This requirement effectively impairs the user experience in using the TTS feature, and results in the word definition feature becoming inconvenient or even useless.

These problems can be addressed by providing an "eyes-free" mode in which the user can control the device and access its various features without actually looking at the device display, in accordance with an embodiment of the present invention. For example, in one embodiment a user can pause a TTS reading by briefly tapping a touchscreen with a single finger. In this case, the TTS reading is paused in response to the tap on the touchscreen, regardless of the location on the screen where the tap occurs. This advantageously allows the user to pause the TTS reading without looking at the display, since a brief tap of a single finger anywhere on the touchscreen will cause the TTS reading to pause. In such cases, the user can locate the device screen through tactile sensation. Similarly, the eyes-free mode can also be configured such that the TTS reading is resumed with a subsequent brief tap of a single finger, again regardless of where on the touchscreen the subsequent tap occurs. Thus, in certain embodiments a TTS reading can be toggled on and off by briefly tapping a single finger on a touchscreen.

The functionality of the eyes-free mode is not limited to the ability to pause and resume a TTS reading. For example, in certain embodiments a context menu can be accessed using another gesture, such as a single finger pressed and held against a touchscreen for a predetermined period. The context menu is accessed in response to the finger being pressed and held against the touchscreen for the predetermined period, regardless of the particular location on the screen where the press-and-hold gesture is detected. Furthermore, when the context menu is accessed, menu options can be presented to the user audibly, again eliminating any need for the user to actually look at the display. The menu options can be navigated with other gestures, such as one or more vertical swipes of a finger. Once again, in this example the menu options are navigated in response to the one or more vertical finger swipes, regardless of where on the screen those swipes may occur. It is unnecessary for the user to actually touch or swipe a particular menu option which might be shown on the display, thus allowing the user to access the menu and navigate its options without actually looking at the display.

The eyes-free mode can additionally or alternatively be used to navigate content stored on an electronic device. For example, in the context of a TTS reading of an e-book, a reading point can be moved forward or backward by horizontally swiping a finger on a touchscreen. How far the reading point is moved can depend, for example, on the number of fingers that are horizontally swiped. For instance, a one-finger swipe can be associated with moving the reading point forward or backward one page, a two-finger swipe can be associated with moving the reading point forward or backward one sentence, and a three-finger swipe can be associated with moving the reading point forward or backward one word. The navigation action associated with these and other gestures may be defined differently based on a particular user's preference or customization. However, regardless of how the particular navigation gestures are defined in a particular embodiment, the user interface can be configured to respond to the gestures without regard to the particular location on the touchscreen they are detected. Again, this advantageously facilitates navigation of content that is being consumed audibly without requiring the user to direct his or her visual attention to the device display.

In certain embodiments an electronic device user interface is configured to operate in a plurality of different contextual modes, wherein the device may respond to a given gesture differently depending on the particular contextual mode of the device. This advantageously allows the range of functionality associated with a single gesture to be expanded. In addition, certain gestures may be invalid or unrecognized in certain contextual modes, thereby allowing the creation of a contextual mode that is less susceptible to accidental or unintentional gestures. The device can also be configured to respond to certain "global" gestures uniformly, regardless of what contextual mode the device is in. Such global gestures could be used, for example, to switch the device between contextual modes or to mute the device.

Thus, and in accordance with an example embodiment, an improved user interface capable of being used to control an electronic device without actually looking at the device display is provided. Such an interface can be used with a broad range of electronic devices that employ technology that can detect and respond to the gestures of a user. Such devices may use a touch sensitive surface such as a touchscreen or a track pad to detect the gestures of a user, and/or they may additionally or alternatively use one or more motion sensors to detect gestures which may not contact any surface. However, the user interface techniques disclosed herein are independent of the particular technology used to detect the user's gestures.

These user interface techniques allow for gesture-based control of a user interface in a relatively fast, efficient and intuitive manner, allowing the user to access basic functions of an electronic device without the need for making visual contact with a device display. This advantageously allows the display to be used in applications where establishing visual contact with the device display is inconvenient, difficult or impossible.

B. HARDWARE AND SYSTEM ARCHITECTURE

Figure 1B:
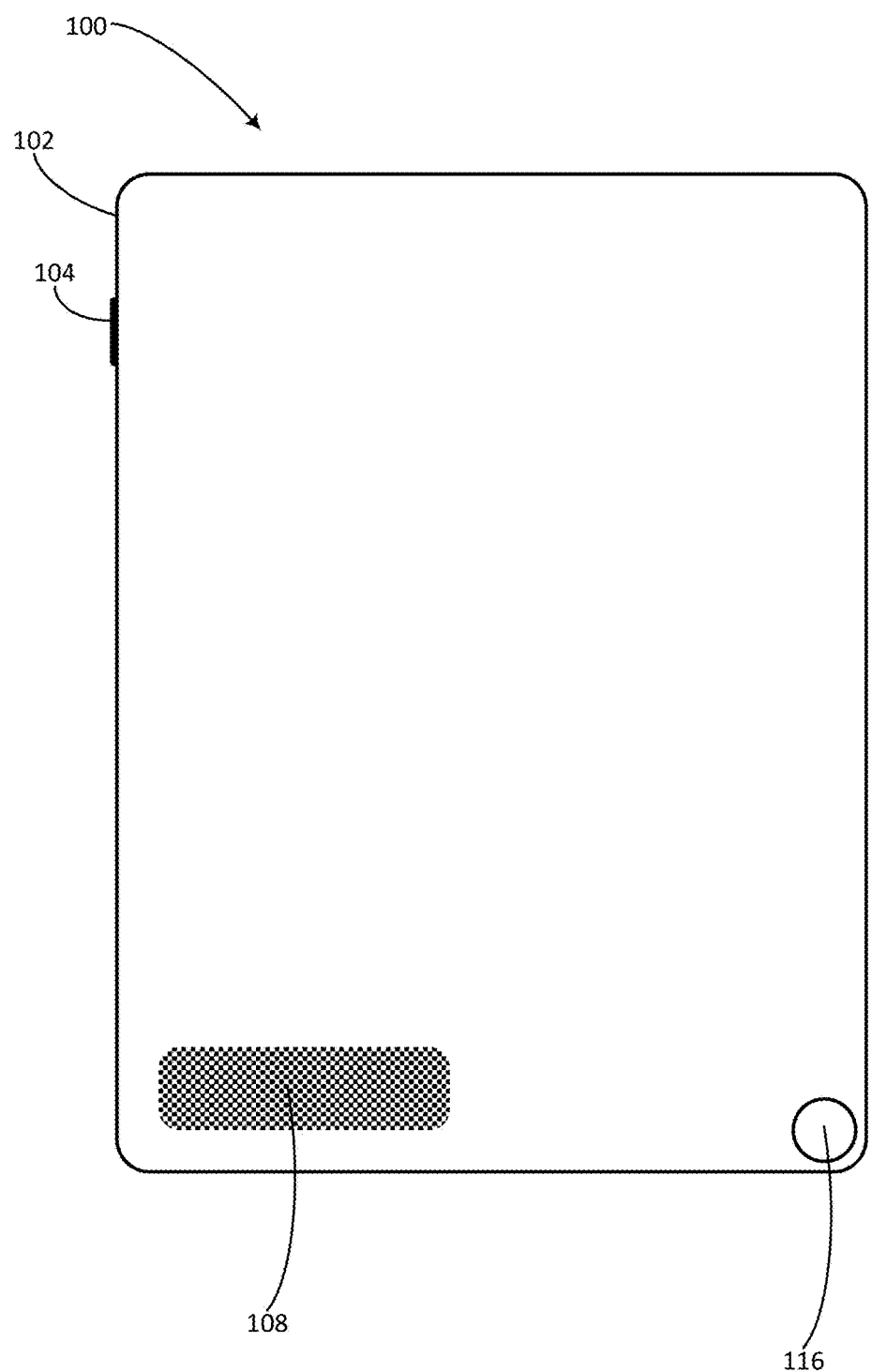
FIG. 1B is a rear view of the example electronic device illustrated in FIG. 1A.
Figure 1C:
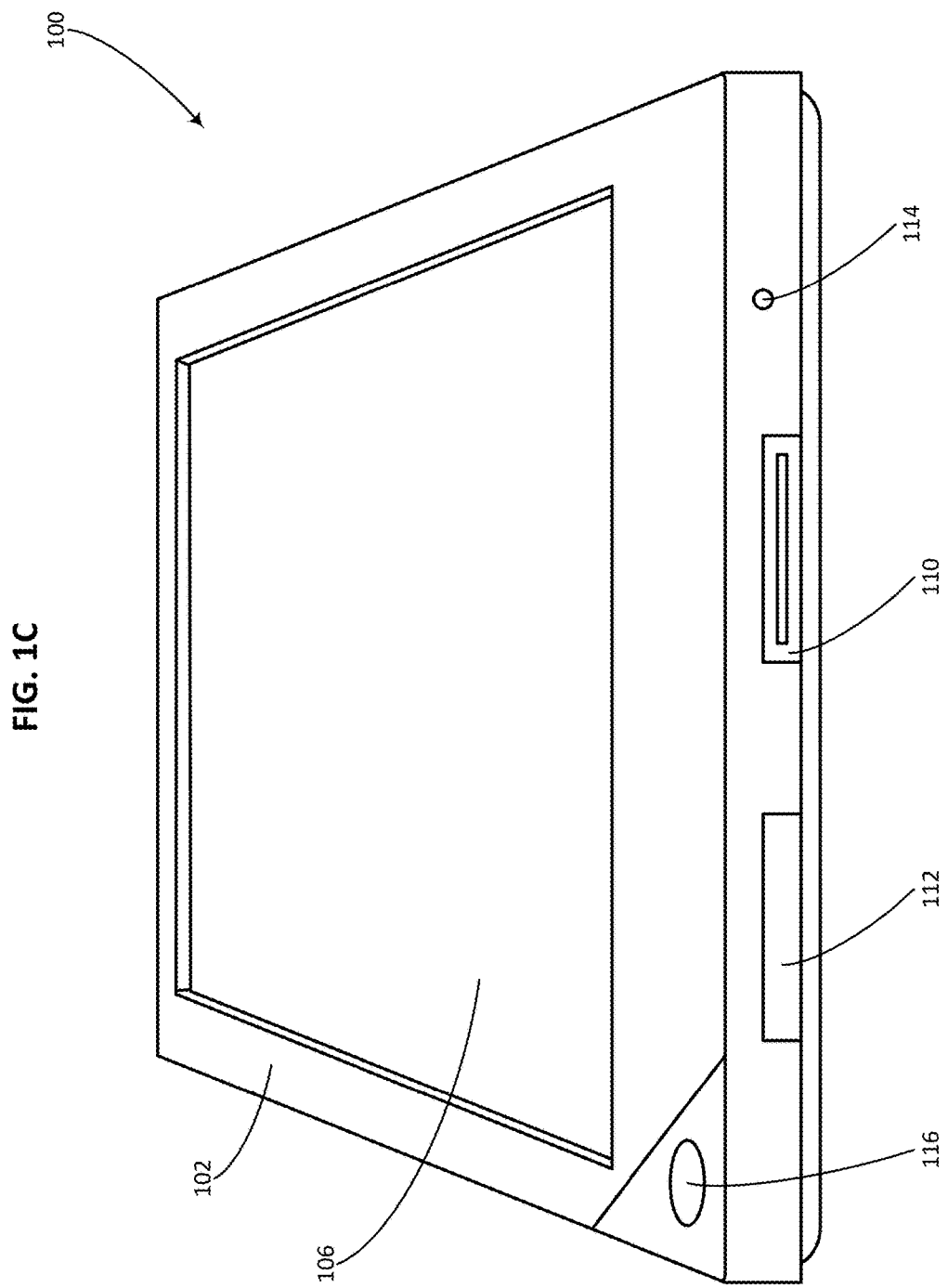
FIG. 1C is a perspective front end view of the example electronic device illustrated in FIG. 1A.

FIGS. 1A through 1C illustrate an electronic touchscreen device 100 having a gesture-based user interface configured in accordance with an example embodiment. FIG. 1A is a front view of the device 100, FIG. 1B is a rear view and FIG. 1C is a perspective front end view. The device 100 could be, for example, a tablet such as the NOOK® HD or NOOK® HD+, available from Barnes & Noble (New York, N.Y.). In a more general sense, the device 100 may be any electronic device having a user interface that is capable of detecting and responding to the gestures of a user, as well as providing content to a user. Examples of such devices include, but are not limited to, tablet computers, mobile phones, laptops, desktop computing systems, televisions, smart display screens, vehicle navigation systems, or any other device capable of detecting and responding to the gestures of a user. As will be appreciated, the claimed invention is not intended to be limited to any particular kind or type of electronic device.

As can be seen with this example configuration, the device 100 comprises a housing 102 that includes a number of hardware features such as a power button 104, a user interface touchscreen 106, a speaker 108, a data/power port 110, a memory card slot 112, a charge indicator light 114 and a grommet 116 that is useful for securing the device 100 in an exterior case (not illustrated). The device 100 may additionally or alternatively include other external hardware features, such as volume control buttons, audio jacks, a microphone, a still camera, a video camera and/or a motion sensing camera. While FIGS. 1A through 1C illustrate one example of how selected hardware features are physically arranged on the device 100, it will be appreciated that the claimed invention is not limited to any particular physical arrangement of hardware features.

The power button 104 can be used to turn the device on and off, and may be configured as a single push button that is toggled on and off, as a slider switch that can be moved back and forth between on and off positions, or as any other appropriate type of control. The power button 104 is optionally used in conjunction with a touch-based user interface control feature that allows the user to confirm a given power transition action request. For example, the user interface may provide a slide bar or tap point graphic to confirm that the user wishes to turn off the device when the power button 104 is pressed. The power button 104 is optionally associated with a user-defined action that occurs when it is pressed.

The touchscreen 106 can be used to provide a user with both consumable content (such as e-books, webpages, still images, motion videos and maps), as well as non-consumable content (such as navigation menus, toolbars, icons, status bars, a battery charge indicator and a clock). Alternative embodiments may have fewer or additional user interface controls and features, or different user interface touchscreen controls and features altogether, depending on the target application of the device. Any such general user interface controls and features can be implemented using any suitable conventional or custom technology, as will be appreciated. In general, however, the touchscreen translates a user's touch into an electrical signal which is then received and processed by an operating system and processor, as will be discussed in turn with reference to FIG. 2A.

In this example embodiment the user interface touchscreen 106 includes a single touch-sensitive home button 118, although in other embodiments a different quantity of home buttons, or no home buttons, may be provided. The home button 118 is provided in a fixed location at the bottom center of the touchscreen 106 and optionally is provided with a raised surface that enables a user to locate it without specifically looking at the device 100. However, in other embodiments the home button 118 is a virtual button that can be moved to different locations on the touchscreen 106, or that can be temporarily removed from the touchscreen altogether, depending on the other content which may be displayed on the touchscreen. In still other embodiments the home button 118 is not included on the touchscreen 106, but is instead configured as a physical button positioned on the housing 102.

The home button 118 can be used to access and control a wide variety of features of the device 100. For example, in one embodiment, when the device is awake and in use, tapping the home button 118 will display a quick navigation menu, which is a toolbar that provides quick access to various features of the device. The home button may also be configured to cease an active function that is currently executing on the device 100, such as an eyes-free TTS reading mode. The home button 118 may further control other functionality if, for example, the user presses and holds the home button. For instance, such a press-and-hold function could engage a power conservation routine where the device is put to sleep or is otherwise placed in a lower power consumption mode. This would allow a user to grab the device by the button, press and keep holding the button as the device was stowed into a bag or purse. Thus, in such an example embodiment the home button may be associated with and control different and unrelated actions: (a) show a quick navigation menu; (b) exit an eyes-free ITS reading mode while keeping the current page displayed, for example, so that another mode can be entered; and (c) put the device to sleep. Numerous other configurations and variations will be apparent in view of this disclosure, and the claimed invention is not intended to be limited to any particular set of hardware buttons, features and/or form factor.

Figure 2A:
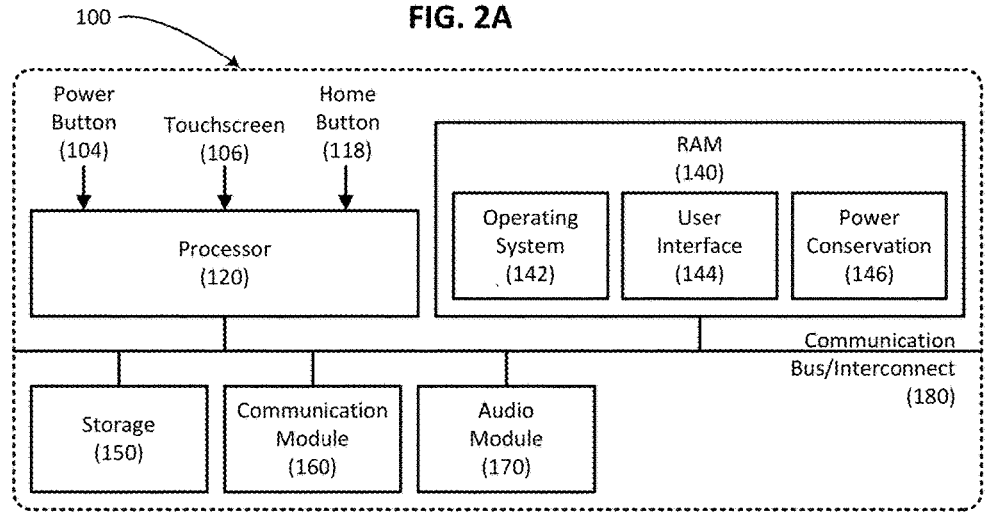
FIG. 2A is a block diagram schematically illustrating selected components of an electronic touchscreen device configured in accordance with an example embodiment.

FIG. 2A schematically illustrates, among other things, selected internal components of the electronic touchscreen device 100 illustrated in FIGS. 1A through 1C. As can be seen, the example device 100 includes a processor 120, random access memory (RAM) 140, additional storage 150, a communication module 160, and an audio module 170. As explained previously, the device 100 further includes user controls, such as the power button 104, the touchscreen 106 and the home button 118, which allow the user to control the processor 120. A communications bus and interconnect 180 is also provided to allow intra-device communications. Other typical componentry and functionality not reflected in the schematic block diagram of FIG. 2A will be apparent. Such other items include, but are not limited to, a battery and a coprocessor. The touchscreen 106 and underlying circuitry are capable of translating a user's physical gesture that contacts the touchscreen 106 into an electronic signal that can be manipulated or otherwise used to trigger a specific user interface action, such as those provided herein. The principles provided herein also apply to other touch sensitive devices, such as a track pad, as well as to motion sensitive devices, such as a motion sensing camera that translates a user's non-contact physical gesture into an electronic signal. However, examples using touchscreen technology are provided here for ease of description.

The processor 120 can be any suitable processor, such as a 1.5 GHz OMAP 4770 applications processor available from Texas Instruments (Dallas, Tex.). It may include one or more coprocessors or controllers to assist in device control. In an example embodiment, the processor 120 receives input from the user, such as input from or otherwise derived via the power button 104, the touchscreen 106, the home button 118, and/or a microphone. The processor 120 can also have a direct connection to a battery so that it can perform base level tasks even during sleep or low power modes.

The RAM 140 can be any suitable type of memory and size, such as 512 MB or 1 GB of synchronous dynamic RAM (SDRAM). The RAM 140 can be implemented with volatile memory, nonvolatile memory or a combination of both technologies. In certain embodiments the RAM 140 includes a number of modules stored therein that can be accessed and executed by the processor 120 and/or a coprocessor. These modules include, but are not limited to, an operating system (OS) module 142, a user interface module 144 and a power conservation module 146. The modules can be implemented, for example, in any suitable programming language, such as C, C++, objective C or JavaScript, or alternatively, using custom or proprietary instruction sets. The modules can be encoded on a machine readable medium that, when executed by the processor 120 and/or a coprocessor, carries out the functionality of the device 100, including a user interface having an eyes-free mode as variously described herein. Other embodiments can be implemented, for instance with gate-level logic; an application-specific integrated circuit (ASIC) or chip set; a microcontroller having input/output capability, such as inputs for receiving user inputs and outputs for directing other components; and/or a number of embedded routines for carrying out the functionality of the device 100. In short, the functional modules can be implemented in hardware, software, firmware or a combination thereof.

The OS module 142 can be implemented with any suitable operating system, but in some example embodiments is implemented with Google Android OS, Linux OS, Microsoft OS or Apple OS. As will be appreciated in light of this disclosure, the techniques provided herein can be implemented on any such platforms. The user interface module 144 is based on touchscreen technology in certain example embodiments, although other interface technologies can additionally or alternatively be used in other embodiments. Examples of such other interface technologies include track pads, keyboards, motion sensing cameras and accelerometers configured to detect motion of the device 100. The power conservation module 146 can be configured as is typically done, such as to automatically transition the device to a low power consumption or sleep mode after a period of inactivity. A wake-up form that sleep mode can be achieved, for example, by a physical button press, a gesture performed on the touch screen, and/or any other appropriate action.

The storage 150 can be implemented with any suitable type of memory and size, such as 32 GB or 16 GB of flash memory. In some example cases, if additional storage space is desired, for example, to store digital books or other content, the storage 150 can be expanded via a micro SD card or other suitable memory storage device inserted into the memory card slot 112. The communication module 160 can be, for instance, any suitable 802.11b/g/n wireless local area network (WLAN) chip or chip set which allows for connection to a local network so that content can be downloaded to the device from a remote location, such as a server associated with a content provider. In other embodiments the communication module 160 alternatively or additionally uses a wired network adapter. The audio module 170 can be configured, for example, to speak or otherwise aurally present selected content, such as an e-book, using the speaker 108. Numerous commercially available TTS modules can be used, such as the Verbose TTS software provided by NCH Software (Greenwood Village, Colo.).

In some specific example embodiments, the housing 102 that contains the various componentry associated with device 100 measures about 9.46 inches high by about 6.41 inches wide by about 0.45 inches thick, and weighs about 18.2 ounces. Any number of suitable form factors can be used, depending on the target application. Examples of typical target applications for the device 100 include a desktop computer, a laptop computer and a mobile phone. The device 100 may be smaller, for example, for smartphone and tablet computer applications, and may be larger for smart computer monitor and laptop applications. The touchscreen 106 can be implemented, for example, with a 9-inch high-definition 1920×1280 display using any suitable touchscreen interface technology.

C. CLIENT-SERVER SYSTEM

Figure 2B:
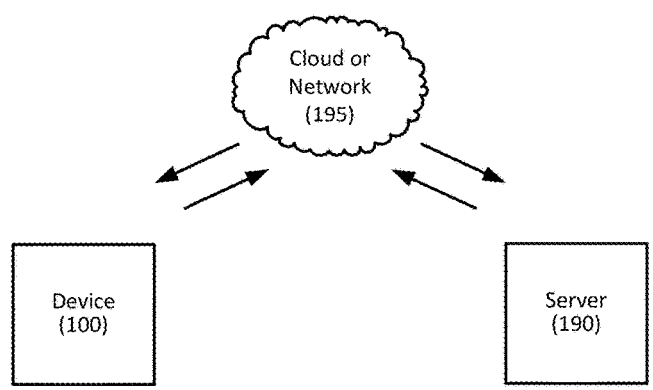
FIG. 2B is a block diagram schematically illustrating a communication system that includes the electronic touchscreen device illustrated in FIG. 2A, wherein the communication system is configured in accordance with an example embodiment.

FIG. 2B schematically illustrates an example embodiment of a communication system that includes an electronic touchscreen device 100. As can be seen, the system generally includes the device 100, such as the one illustrated in FIGS. 1A-1C and 2A, that is capable of communicating with a server 190 via a cloud or any other suitable type of network 195. In this example embodiment, the device 100 may be an e-book reader, a mobile phone, a laptop computer, a tablet computer, a desktop computer, or any other computing device that is capable of detecting and responding to the gestures of a user. The cloud or network 195 may be a public and/or private network, such as a private local area network operatively coupled to a wide area network such as the Internet.

In the illustrated example embodiment, the server 190 may be programmed or otherwise configured to receive content requests from a user via the touchscreen 106 and to respond to those requests by providing the user with requested or otherwise recommended content. In some such embodiments, the server 190 is configured to remotely provide an eyes-free mode as described herein to the device 100, for example using JavaScript or some other browser-based technology. In other embodiments, portions of the eyes-free mode methodology are executed on the server 190 and other portions of the methodology are executed on the device 100. Numerous server-side/client-side execution schemes can be implemented to facilitate an eyes-free mode in accordance with a given embodiment, as will be apparent in light of this disclosure.

D. EYES-FREE MODE

As described previously, an eyes-free mode can advantageously allow a user to easily control a device without actually looking at the device display. In such an eyes-free mode, the user can control the device by performing one or more gestures that are detected by the device, wherein a gesture is interpreted by the device without regard to a specific location where the gesture is made. Because the specific location is not critical, an eyes-free mode advantageously allows a user to interact with a user interface in situations where he or she has little or no ability to establish visual contact with the device display. While an eyes-free mode provides particular advantages which are applicable to the TTS reading of an e-book, these and other advantages are also applicable in other contexts, such as software control, geographical navigation, media playback and social networking. Touchscreens, motion sensing cameras, accelerometers and other appropriate sensing technologies can be used to detect the user's gestures in an eyes-free mode.

In certain embodiments it is possible to transition the device 100 from a standard operating mode to an eyes-free mode using, for example, a hierarchical menu of option settings, a shortcut icon, a shortcut gesture, a voice command or any other suitable user interface navigation method. In other embodiments the eyes-free mode is automatically engaged whenever certain events occur, such as whenever the user invokes a TTS reading feature and/or whenever the user opens an e-book. In still other embodiments the eyes-free mode is engaged using a dedicated external switch mounted on the housing 102. It is possible to transition the device 100 from the eyes-free mode back to the standard mode using similar or other techniques. For example, in certain example embodiments it is possible to leave the eyes-free mode by pressing the home button 118, while in other example embodiments the eyes-free mode can be left by double-tapping two fingers on the touchscreen 106. In one embodiment the particular method for transitioning the device 100 to and from the eyes-free mode is user-configurable.

1. Use of Overlays in an Eyes-Free Mode

On a conceptual level, an eyes-free mode can be configured with one or more interactive overlays. An overlay is a contextual mode of operation of the eyes-free mode, wherein certain commands may be unavailable in selected overlays, and wherein certain gestures may be associated with different commands in different overlays. Other than these functional differences, the overlays can be transparent to the user. However, in alternative embodiments an indicator, such as a status icon, is provided as a way to visually communicate which overlay is being used at a given time. Using multiple overlays advantageously increases the functionality that can be obtained from a single gesture by defining that gesture differently in the various overlays. And because an overlay can be defined wherein only a limited number of gestures will be recognized and responded to, providing multiple overlays advantageously allows for the creation of an enhanced-stability overlay that is less susceptible to detecting accidental or inadvertent gestures.

FIG. 3 conceptually illustrates multiple overlays for use with an example embodiment of an eyes-free mode. In this example, reading overlay 210 corresponds to reading and navigation functions useful for applications such as a TTS reading of an e-book. For instance, the reading overlay 210 could be used to receive commands for playing and pausing a TTS reading, as well as for navigating an e-book by word, sentence, paragraph, section, page and/or other document segment. The reading overlay 210 optionally further includes a reading mode 212 and a manual mode 214, both of which will be described in greater detail below. The options overlay 220 corresponds to an interface for accessing additional functions of the electronic device 100. For example, the options overlay 220 could be used to access dictionary and spelling functions associated with a TTS reading; to add and delete bookmarks from content stored on the device 100; and to launch other applications that are saved or otherwise available on the device 100. The control overlay 230 corresponds to context-specific sub-functions that depend on a particular function selected in the options overlay 220. For instance, the control overlay 230 could be used to choose or adjust a particular setting related to a function invoked using the options overlay 220. The control overlay 230 further includes one more modes corresponding to various functions of the device 100; these modes will also be described in greater detail below.

The particular functions and examples described here with respect to FIG. 3 are only a subset of the possible configurations of the overlays. More or fewer overlays and/or overlay modes can be used in a given embodiment, and additional or alternative functions can be enabled as well. The multiple overlays can be conceptualized as being vertically arranged in a hierarchical fashion, wherein the functions available in the eyes-only mode are reached by navigating downward through the hierarchy. A particular user interface element positioned as a bottom-level item in the hierarchy invokes a target function (such as the spelling mode illustrated in FIG. 3), while a user interface element positioned further up in the hierarchy serves as a container for a grouping of functions (such as the options overlay illustrated in FIG. 3). In general, the number and functionality of the overlays can be user-defined, while in other embodiments the overlays are not configurable, are hard coded, or are otherwise provisioned by default.

The degree of hard-coding versus user-configurability of the various overlays can vary from one embodiment to the next, and the claimed invention is not intended to be limited to any particular configuration scheme of any kind. Moreover, the use of overlays as described herein can be used in applications other than a TTS reading of an e-book. For example, in certain embodiments the overlays can be configured to provide functionality specific to the context of a vehicle navigation system, providing functions such as pausing and resuming a navigated route, searching for points of interest, and configuring navigation options. Indeed, any number of applications or device functions may benefit from an eyes-free mode as provided herein, whether user-configurable or not, and the claimed invention is not intended to be limited to any particular application or set of applications.

Transition gestures can be used to move from one overlay to another. For example, a "forward" transition gesture 202 could be used to move from the reading overlay 210 to the options overlay 220, and likewise from the options overlay 220 to the control overlay 230. In similar fashion, a "backward" transition gesture 204 could be used to move from the control overlay 230 to the options overlay 220, and likewise from the options overlay 220 to the reading overlay. In one embodiment, a single-finger press-and-hold gesture is recognized as a forward transition gesture 202, while a two-finger double tap is recognized as a backward transition gesture 204. This, in such embodiments the user could move from the reading overlay 210 to the options overlay 220 by pressing and holding one finger anywhere on the touchscreen 106, and could move from the options overlay 220 to the reading overlay 210 by again pressing and holding one finger anywhere on the touchscreen 106. Additional transition gestures can be configured in other embodiments. For example, in certain embodiments a reading overlay transition gesture 206 is provided to move from the control overlay 230 directly to the reading overlay 210. The transition gestures are optionally recognized regardless of the particular location on the touchscreen 106 where they are invoked; this advantageously allows the user to move between overlays without actually focusing attention on the content being displayed on the touchscreen 106. In other embodiments, the transition gestures are non-contact gestures recognized by a motion sensing camera. In still other embodiments the transition gestures are movements of the device 100 as detected by an internal accelerometer.

In embodiments where the transition gestures are uniformly recognized and responded to in the various overlays, the transition gestures can be considered global gestures that are independent of context. However in other embodiments different transition gestures can be used, for example, to (a) move forward from the reading overlay 210 to the options overlay 220, and (b) move forward from the options overlay 220 to the control overlay 230. For example, in a modified embodiment a single-finger press-and-hold gesture is used to transition from the reading overlay 210 to the options overlay 220, while a single-finger double tap is used to transition from the options overlay 220 to the control overlay 230.

Audio feedback is optionally provided when the device 100 detects and responds to a gesture, such as an overlay transition gesture or a mode transition gesture. The audio feedback can be provided, for example, using the speaker 108 and/or using an external audio source, such as portable headphones connected to an audio jack. The audio feedback indicates to the user that the gesture was received and acted upon correctly. For example the device 100 can be configured to announce "menus" or "entering menu mode" when the user transitions from the reading overlay 210 to the options overlay 220. Or the device 100 can be configured to announce a particular function, such as "define" or "spell", when the user transitions from the options overlay 220 to a control overlay 230 associated with that particular function. Similar context-sensitive audio cues can be provided when the user transitions backward from an overlay; alternatively a uniform audio cue, such as a unique tone, can be played when the user makes a backward transition. In certain embodiments the audio cues are user-configurable. In still other embodiments the device 100 includes a mechanical oscillator capable of slightly vibrating the device 100 when a transition occurs, thus enabling the device 100 to provide the user with tactile feedback when a transition occurs.

2. Reading Overlay

The reading overlay 210 is generally configured to facilitate the TTS reading of content stored on the electronic device 100. Examples of such content include e-books, data files and audiobooks. Although certain of the examples described in this specification describe functionality with respect to an e-book, it will be understood that such examples can also be applied to other types of content stored on the device 100. In certain embodiments, upon opening an e-book or other similar content, the device 100 is automatically transitioned into the reading overlay 210 of an eyes-free mode. In other embodiments, other overlays can be provided as a default state. The device 100 can optionally be configured to audibly announce the page number of a current reading position associated with a TTS reading of an e-book upon opening an e-book, upon entering the eyes-free mode, and/or upon entering the reading overlay 210. This advantageously provides the user with information regarding the location of the current reading position in the e-book. In certain embodiments the current reading position upon opening an e-book is defined as the last reading position during the previous use of that e-book. In other embodiments other default or starting reading positions can be configured.

As illustrated in FIG. 3, the reading overlay 210 is optionally provided with a reading mode 212 and a manual mode 214. As with the overlay transition gestures described above, the user can toggle between the reading mode 212 and the manual mode 214 using a mode transition gesture 216. For example, in one embodiment a single-finger tap is used to toggle back-and-forth between the reading mode 212 and the manual mode 214, although other mode transition gestures can be configured in other embodiments. In the reading mode 212, the device 100 can be configured to present an audible TTS reading of selected content, including automatically turning pages as appropriate. In the manual mode 214, the device 100 can be configured to pause the TTS reading and wait for further user instructions, including instructions related to manual navigation of the content. Thus, in certain embodiments the mode tradition gesture 216 also serves to start or stop an automated TTS reading of content. The mode transition gesture 216 can be detected and responded to without regard to the specific location on the touchscreen 106 where the user makes the gesture. Also, as with the overlay transition gestures described above, the mode transition gesture 216 is optionally accompanied by feedback, such as an audible announcement or a tactile vibration. Other types of user feedback can be configured in other embodiments.

In an example embodiment of the reading overlay 210, the device 100 is configured to detect certain gestures associated with navigation actions which are useful during a TTS reading of an e-book or other content. Table A provides examples of selected gestures which can be particularly useful in this regard; additional or alternative gestures may be provided in other embodiments of the reading overlay 210.

TABLE A

Example navigation gestures and corresponding actions available in a reading overlay with an eyes-free TTS reading feature.

| Gesture | Action |
| --- | --- |
| one finger single tap | start or stop reading |
| one finger horizontal fling left | navigate forward one page |
| one finger horizontal fling right | navigate backward one page |
| two finger horizontal fling left | navigate backward one sentence |

TABLE A-continued

Example navigation gestures and corresponding actions available
in a reading overlay with an eyes-free TTS reading feature.

| Gesture | Action |
| --- | --- |
| two finger horizontal fling right | navigate forward one sentence |
| three finger horizontal fling left | navigate backward one word |
| three finger horizontal fling right | navigate forward one word |
| one finger press-and-hold | transition to options overlay |

Thus, for example, a user listening to a TTS reading of an e-book could pause the reading by tapping one finger anywhere on the touchscreen 106, and could resume the TTS reading by repeating that gesture. To provide another example, the user could navigate forward one sentence by horizontally flinging two fingers to the right. The device 100 can be configured to respond to gestures such as these without regard to the specific location on the touchscreen 106 where the user made the gesture, effectively turning the touchscreen 106 into a uniformly-responding control pad. This advantageously allows the user to navigate the e-book without having to look at the touchscreen 106. It will be appreciated that the gestures and actions listed in Table A are only examples, and that additional or alternative gestures and actions may be available in the reading overlay 210 in other embodiments. For example, in an alternative embodiment a four finger horizontal fling can be configured to navigate by one section, chapter or other user-configured level of navigation granularity. The correspondence between the gestures and the actions provided in Table A can be modified as well. For example, in an alternative embodiment a one finger horizontal fling left gesture could be associated with navigation backward one page. In certain embodiments the number and functionality of the recognized gestures can be user-defined, while in other embodiments the gestures and their associated actions are not configurable, are hard coded, or are otherwise provisioned by default. The degree of hard-coding versus user-configurability can vary from one embodiment to the next, and the claimed invention is not intended to be limited to any particular configuration scheme of any kind.

As described previously with respect to overlay and mode transitions, audio feedback is also optionally provided when the device 100 detects and responds to a gesture, such as one of the example navigation gestures from Table A, in the reading overlay 210. For instance, the device 100 can be configured to play a soft page turning "swish" sound in response to a one-finger horizontal fling left or right, thus alerting the user that a page navigation has occurred. Alternatively or additionally, the device 100 can be configured to make an audible page announcement, such as "Page 15" or "Page 15 of 20" when an event such as a page navigation or a pausing or resuming of the TTS reading occurs. Such location announcements are not limited to providing page information; they can alternatively or additionally provide other information such as line, paragraph or elapsed time information. In some embodiments audio feedback is also provided upon detection of an unrecognized or invalid gesture.

In one embodiment the example navigation gestures provided in Table A can be detected and responded to regardless of whether the reading of content stored on the device is active or paused. For example, if a TTS reading is in progress when the user performs one of the navigation gestures listed in Table A, the reading can be configured to continue automatically at the next or previous page, sentence, word or other navigation point. On the other hand, if the TTS reading is paused when the user performs a navigation gesture, the device 100 can optionally be configured to read only the next or previous page, sentence, word or other content segment. This configuration advantageously allows the user to select a particular sentence, word or other content segment for use with other overlays without actually looking at the device display. Alternatively, in the case of a page navigation, the paused device 100 can be configured to make an audible page announcement, as described previously. In yet another alternative embodiment, the paused device 100 can be configured to resume reading continuously from the new reading point as indicated by the user's navigation gesture. However, in other embodiments the navigation gestures provided in Table A, optionally including the forward transition gesture 202 used to transition to the options overlay 220, are detected and responded to only when the device 100 is in the manual mode 214 of the reading overlay 210. This effectively reduces the number of gestures which may be detected and responded to in the reading mode 212, thereby reducing the likelihood that a TTS reading is interrupted due to detection of an inadvertent or accidental gesture.

In certain embodiments, when the user pauses the TTS reading of content stored on the device 100 by performing the mode transition gesture 216, additional latent functions are performed in addition to the actual pausing of the reading. For example, if the reading is paused in the middle of a sentence, the current reading position can be moved to the beginning of that sentence. Thus, when the TTS reading is resumed, the reading is resumed from the beginning of a sentence rather than from mid-sentence. This can provide the user with a better sense of context when the TTS reading is resumed. In alternative embodiments the current reading position can be moved to the beginning of the current paragraph, section, chapter, or the like, when the TTS reading is paused. How far back the reading position is moved upon pausing the TTS reading, if it is moved at all, is optionally user-configurable.

As another example of a latent function that is performed when the TTS reading of content stored on the device 100 is paused, a selected portion of the content can be copied to a virtual clipboard that corresponds to predetermined region of the RAM 140. For example, if the reading is paused in the middle of a sentence, the first word of that sentence and/or the entire text of that sentence are saved in the clipboard. In other embodiments other portions of the content are stored in the clipboard, such as the current word, the current line, the current paragraph, or some other user-configured content segment. A user may navigate through the content in the manual mode 214 of the reading overlay 210 using the sentence-by-sentence or word-by-word navigation gestures provided in Table A; this would allow the user to save a selected sentence, word and/or other content segment in the virtual clipboard. Saving a portion of the content to a virtual clipboard allows the user to perform additional functions with the saved content. Such functionality can be accessed, for example, using the options overlay 220, which will be described in turn, or using other applications that are saved or otherwise available on the device 100.

3. Options Overlay

As described previously, the options overlay 220 is generally configured to provide access to additional functionality of the electronic device 100 beyond the TTS reading of content stored thereon. Examples of such additional functionality include access to reference materials such as dictionaries, thesauri and encyclopedias, as well as to searching, note taking, hyperlinking and spelling functions. As described above, the options overlay 220 can be accessed, for example, by performing a forward transition gesture 202 from the manual mode 214 of the reading overlay 210. One example of a forward transition gesture 202 is a single-finger press-and-hold gesture, as indicated in Table A. However, other transition gestures and techniques can be implemented in other embodiments, including but not limited to contactless transition gestures recognized by a motion sensing camera, spoken commands recognized by a microphone and physical movements of the device detected by an internal accelerometer, compass and/or gyroscope. The options overlay 220 can also be accessed in a similar fashion by performing a backward transition gesture 204 from the control overlay 230, as will be described in turn.

Figure 4A:
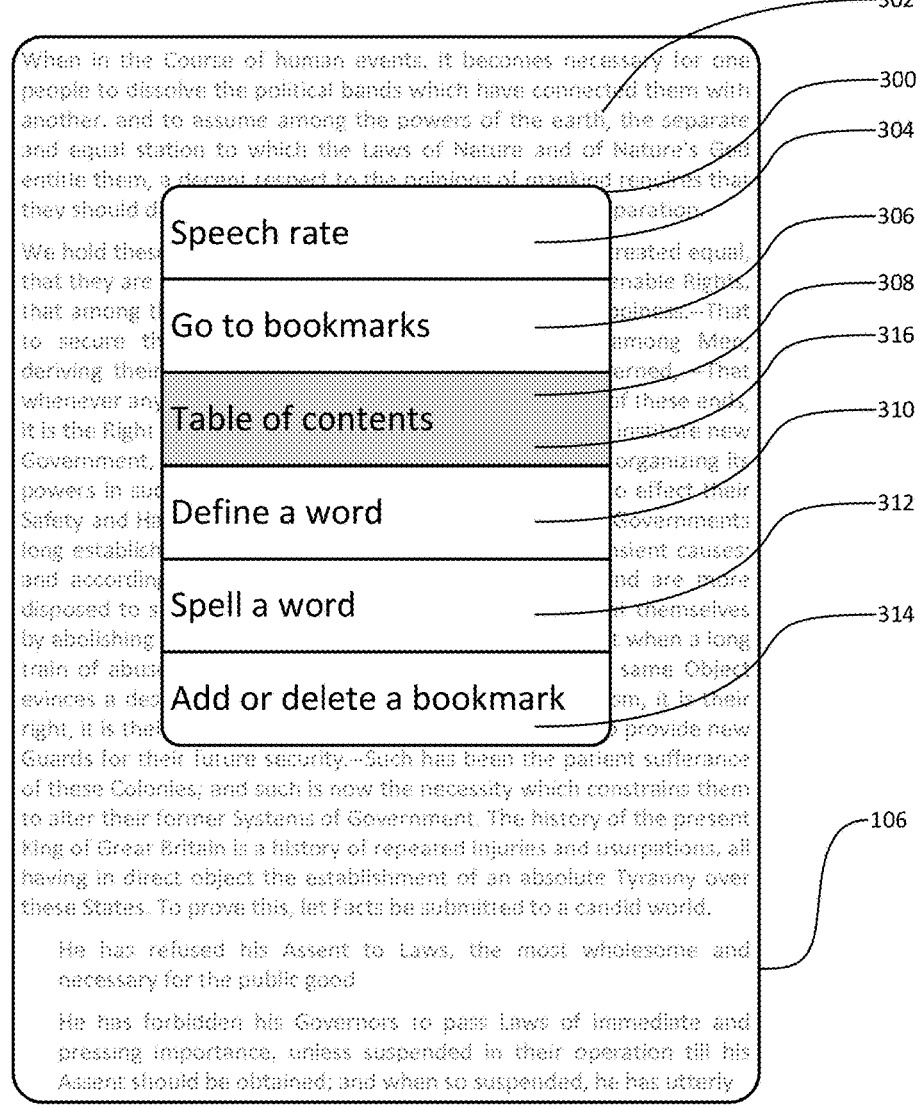
FIG. 4A is a schematic illustration of a screenshot of the user interface of the electronic touchscreen device illustrated in FIGS. 1A-1C, wherein the screenshot displays an example configuration of an options overlay, in accordance with an embodiment of the present invention.

FIG. 4A is a screenshot that schematically illustrates one embodiment of the options overlay 220. As can be seen, upon entering the options overlay 220 the user is presented with a menu 300 listing several available options. The menu options may correspond to additional functionality of the device 100. The options can be presented in a graphical menu displayed on all or a portion of the touchscreen 106, and/or as an spoken list of choices presented aurally using the speaker 108. In an alternative embodiment the menu 300 is not displayed at all, and is instead announced to the user in an audible format. However, regardless of whether and how the menu 300 is provided on the touchscreen 106, it will be appreciated that presenting the menu options in an audible format advantageously allows the user to understand which options are available without having to actually look at the device 100. Such a configuration is particularly useful in situations where establishing visual contact with the display is inconvenient, difficult or impossible. The menu 300 is optionally configured to appear as being overlaid on content 302 that had been displayed the touchscreen 106 when the user performed the forward transition gesture 202. While the menu options are arranged vertically in the example embodiment illustrated in FIG. 4A, other spatial arrangements can be used in other embodiments.

The menu 300 in the example embodiment of FIG. 4A includes several options, including a speech rate option 304, a bookmarks option 306, a table of contents (TOC) navigation option 308, a word definition option 310, a spelling option 312, and an add/delete bookmark option 314. Additional or alternative menu options can be provided in other embodiments, and in certain embodiments fewer menu options are provided. Examples of other functions that can be accessed via the menu 300 include, but are not limited to, note-taking functionality and searching functionality. The particular menu options included in menu 300 are user-configurable in certain embodiments, while in other embodiments the menu options are not configurable, are hard coded, or are otherwise provisioned by default. The degree of hard-coding versus user-configurability can vary from one embodiment to the next, and the claimed invention is not intended to be limited to any particular configuration scheme of any kind.

The menu 300 can be conceptually and/or graphically subdivided into multiple subsections, such as a subsection including context-sensitive actions (for example, word definition, word spelling, and the like), and a subsection including global actions (for example, TOC links, bookmark links, and the like). In such embodiments the applicable context for the context-sensitive actions is the last word, sentence or other content segment that was being read before the user transitioned from the reading overlay 210 to the options overlay 220. The selected content can be, for instance, a word selected using the example navigation gestures provided in Table A, as applied in the manual mode 214 of the reading overlay 210, as described above. FIG. 4B is a screenshot that schematically illustrates a menu 350 that is graphically subdivided into a first menu subsection 352 that includes context-sensitive menu options, and a second menu subsection 354 that includes global menu options. The menu subsections 352, 354 are optionally separated by a bar 356, although other graphical separators, or no separator, can be used in other embodiments. In certain embodiments the menu can be separated into more than two subsections.

In one embodiment a default or focused menu option is indicated by highlighting 316, such as color highlighting, a flashing background or some other indicia. In certain embodiments the name of a default or focused menu option is read aloud using the speaker 108. For example, in one embodiment the TOC navigation option 308 is initially focused upon as a default option when the options overlay 220 is first entered, such that upon entering the options overlay 220 the device 100 makes an audible announcement such as "menu: table of contents". In other embodiments other menu options can be set as the default menu option upon entering the options overlay 220. In still other embodiments the default menu option is set to be the menu option that was selected the last time the user accessed the options overlay 220.

In an example embodiment of the options overlay 220, the menu is configured to be navigable without looking at the device display, or with reduced visual reference to the device display. This can be accomplished by configuring the device 100 to detect and respond to certain gestures associated with the options overlay 220. Table B provides examples of selected gestures which can be particularly useful in this regard; additional or alternative gestures may be provided in other embodiments of the reading overlay 220. The example gestures listed in Table B can be used to navigate the menu 300 illustrated in FIG. 4A and the graphically subdivided menu 350 illustrated in FIG. 4B, as well as other menu configurations used in conjunction with the options overlay 220.

TABLE B

Example menu navigation gestures and corresponding actions available in an options overlay of an eyes-free mode.

| Gesture | Action |
| --- | --- |
| one finger vertical fling up | move menu focus upward |
| one finger vertical fling down | move menu focus downward |
| one finger double tap | select the menu item that is in focus |
| two finger double tap | transition backward to reading overlay |

In certain embodiments, selecting a menu option comprises focusing on, or otherwise navigating to, the desired menu option, followed by selecting the option that is in focus. In one such embodiment, either of the menus 300, 350 can be conceptualized as a vertical column that can be navigated upwards or downwards, and a desired menu option can be focused on using the single-finger vertical fling gestures provided in Table B. Other gestures can be used in other embodiments. Furthermore, the example gestures listed in Table B can be detected and responded to without regard to the specific location on the touchscreen 106 where the gesture is made. Thus, in such embodiments simply tapping on a displayed or in-focus menu option would not serve to actually select that option. Rather, an in-focus menu option would be selected based detection of the appropriate gesture listed in Table B, regardless of the location on the touchscreen 106 where that gesture was actually detected.

To further facilitate this eyes-free functionality, the device 100 is optionally configured to also provide audible feedback indicating an in-focus menu option in the options overlay 220. For instance, in the example embodiment described above, upon entering the options overlay 220, the device 100 makes an audible announcement such as "menu: table of contents", which corresponds to the default menu option in this example. If the user makes a single-finger vertical fling up to navigate to the bookmark option 314, for example, the device 100 can be configured to make an audible announcement such as "menu: go to bookmarks". Likewise, if the user makes a single-finger vertical fling down to navigate to the word definition option 310, the device 100 can be configured to make an audible announcement such as "menu: definitions". Other appropriate announcements can be made in other embodiments. These announcements can optionally be preceded or otherwise accompanied by a tone or other sound to indicate that a menu navigation gesture has been detected and responded to. In a modified embodiment, a different tone or other sound can be played when the user navigates to the topmost or bottommost option in the menu, thereby further helping the user to visualize the contents and arrangement of menu without actually looking at the device 100. Likewise, in the case of a graphically separated menu, such as the menu 350 illustrated in FIG. 4B, the device 100 can be configured to play a distinctive sound or make a spoken announcement when the user scrolls from the context-sensitive menu subsection 352 to the global menu subsection 354, and vice-versa.

Thus it is possible to transition forward from the options overlay 220 to the control overlay 230 by selecting a menu option using, for example, the single-finger double tap gesture provided in Table B. As noted previously, other forward transition gestures can be used in other embodiments. It is also possible to transition backward from the options overlay 220 to the reading overlay 210 without selecting any of the menu options. For example, Table B indicates that performing a two-finger double tap in the options overlay 220 will transition the user interface backward to the reading overlay 210 without making a selection from the menu.

4. Control Overlay

The control overlay 230 is generally configured to implement context-specific sub-functions that depend on the particular menu option selected in the options overlay 220. Examples of such sub-functions include applications that provide access to reference materials such as dictionaries, thesauri and encyclopedias, as well as to searching, note taking, hyperlinking and spelling functions. The control overlay 230 can also be used in conjunction with other applications that are saved or otherwise available on the device 100. Several examples of how such functionality can be implemented in an eyes-free mode are described here. However, any number of applications or functions may benefit from an eyes-free mode, and the claimed invention is not intended to be limited to any particular function or set of functions.

As described above, the control overlay 230 can be accessed, for example, by performing a forward transition gesture 202 from the options overlay 220. One example of a forward transition gesture 202 is a single-finger double tap gesture, as indicated in Table B. However, other transition gestures and techniques can be implemented in other embodiments, including but not limited to contactless transition gestures recognized by a motion sensing camera, spoken commands recognized by a microphone, and physical movements of the device detected by an internal accelerometer, gyroscope and/or compass. If the user no longer wishes to use the control overlay 230, it is possible to transition back to the options overlay 220 using a backward transition gesture 204, such as a two-finger double tap gesture. In a modified embodiment, as illustrated in FIG. 3 for example, a separate reading overlay transition gesture 206 is provided to allow the user to transition directly from the control overlay 230 to the reading overlay 210 without passing through the options overlay 220.

i. Speech Rate Adjustment Mode

In certain embodiments the menu provided in the options overlay 220 includes a speech rate option 304. The speech rate option 304 is an example of a global menu option that could be provided in the second menu subsection 354 of the example embodiment illustrated in FIG. 4B. Selecting the speech rate option 304 using the example menu navigation gestures provided in Table B transitions the device 100 into a speech rate adjustment mode of the control overlay 230. The speech rate adjustment mode is one of a plurality of modes that may be included within the control overlay 230, as illustrated in FIG. 3. In such a mode the user may adjust the speech rate of an audiobook or TTS reading. In one embodiment of the speech rate adjustment mode, the speech rate can be adjusted faster or slower by making upwards or downwards vertical swipe gestures on the touchscreen 106, respectively. For example, each vertical swipe can correspond to a 1%, 5%, 10%, 15%, 20% or other relative adjustment in the speech rate. Other control gestures can be used to control the speech rate in other embodiments. Detection of and response to such gestures in the speech rate adjustment mode may result in audible feedback, such as the phrase "speech rate adjusted" spoken at the new speech rate. As with other eyes-free mode user interfaces, the vertical swipe gestures are detected and responded to without regard to the specific location on the touchscreen 106 where those gestures are detected. This advantageously eliminates any need for the user to visually focus on the device display to adjust the speech rate. The user may leave the speech rate adjustment mode using, for example, a backward transition gesture 204 to transition back to the options overlay 220, or a reading overlay transition gesture 206 to transition directly back to the reading overlay 210.

Figure 5A:
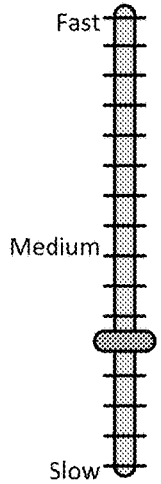
FIG. 5A is a schematic illustration of a screenshot of the user interface of the electronic touchscreen device illustrated in FIGS. 1A-1C, wherein the screenshot displays an example configuration of a speech rate adjustment mode of a control overlay, in accordance with an embodiment of the present invention.

The speech rate adjustment mode optionally includes a user interface having a virtual slider, dial, drop-down box or other control that provides visual feedback regarding how the selected speech rate compares to a range of available speech rates. FIG. 5A is a screenshot that schematically illustrates one embodiment of the speech rate adjustment mode of the control overlay 230. This example embodiment includes a speech rate adjustment dialog box 400 having a slider bar 402 displayed therein. The user can adjust the speech rate faster or slower by making a upwards or downwards vertical swipe gestures on the touchscreen 106, respectively. In certain embodiments of the eyes-free mode, the user need not coordinate his or her control gestures with the location of slider bar 402 displayed in the dialog box 400; this advantageously allows the user to adjust the speech rate without actually looking at the touchscreen 106. Thus, it will be appreciated that the user interface illustrated in FIG. 5A is optional given that the eyes-free mode is configured for use in situations where looking at the device display is inconvenient, undesirable or impossible. Therefore, in certain modified embodiments the dialog box 400 is not used, and the content stored on the device 100 is displayed while the user adjusts the speech rate using gestures recognized by the speech rate adjustment mode of the control overlay 230.

ii. Bookmark and TOC Navigation Modes

In certain embodiments the menu provided in the options overlay 220 includes a bookmark option 306 and/or a TOC navigation option 308. The bookmark option 306 and the TOC navigation option 308 are examples of global menu options that could be provided in the second menu subsection 354 of the example embodiment illustrated in FIG. 4B. Selecting the bookmarks option 306 using the example menu navigation gestures provided in Table B transitions the device 100 into a bookmark navigation mode of the control overlay 230. Likewise, selecting the TOC navigation option 308 transitions the device 100 into a TOC navigation mode of the control overlay 230. The bookmark and TOC navigation modes are two of a plurality of modes that may be included within the control overlay 230, as illustrated in FIG. 3. In either of these modes the user may select from a list of hyperlinks that link to other portions of the content stored on the device 100. The hyperlinks can be preset and/or, in the case of the bookmark navigation mode for example, user-defined. It will be appreciated that the control overlay 230 includes additional or alternative navigation modes to facilitate eyes-free navigation of the content stored on the device 100. Examples of such navigation modes include, but are not limited to, endnote navigation, footnote navigation and reference navigation.

The bookmark hyperlinks can be identified by text associated with bookmarked content (such as a first word, phrase, sentence or other content segment), by a page number, by a chapter number and/or by some other index. Similarly, the TOC hyperlinks can be identified with information such as chapter number, chapter title, section name, page number and/or some other index. The hyperlinks can be presented using a menu displayed on the touchscreen 106, for example, and/or audibly using the speaker 108. This menu can be navigated, and the menu options included therein can be selected, in similar fashion to the control menu 300 described above with respect to the control overlay 220, and therefore a detailed description of such menu navigation and selection techniques will not be repeated here. However, it will be appreciated that the menu of hyperlinks can be used in a way that does not require the user to focus attention on the device display. Upon selection of a bookmark or TOC entry, the device 100 navigates directly to the linked content, and optionally transitions back to the reading overlay 210. Alternatively, one or more backward transition gestures can be used to transition back to the options overlay 220 and/or the reading overlay 210.

Figure 5B:
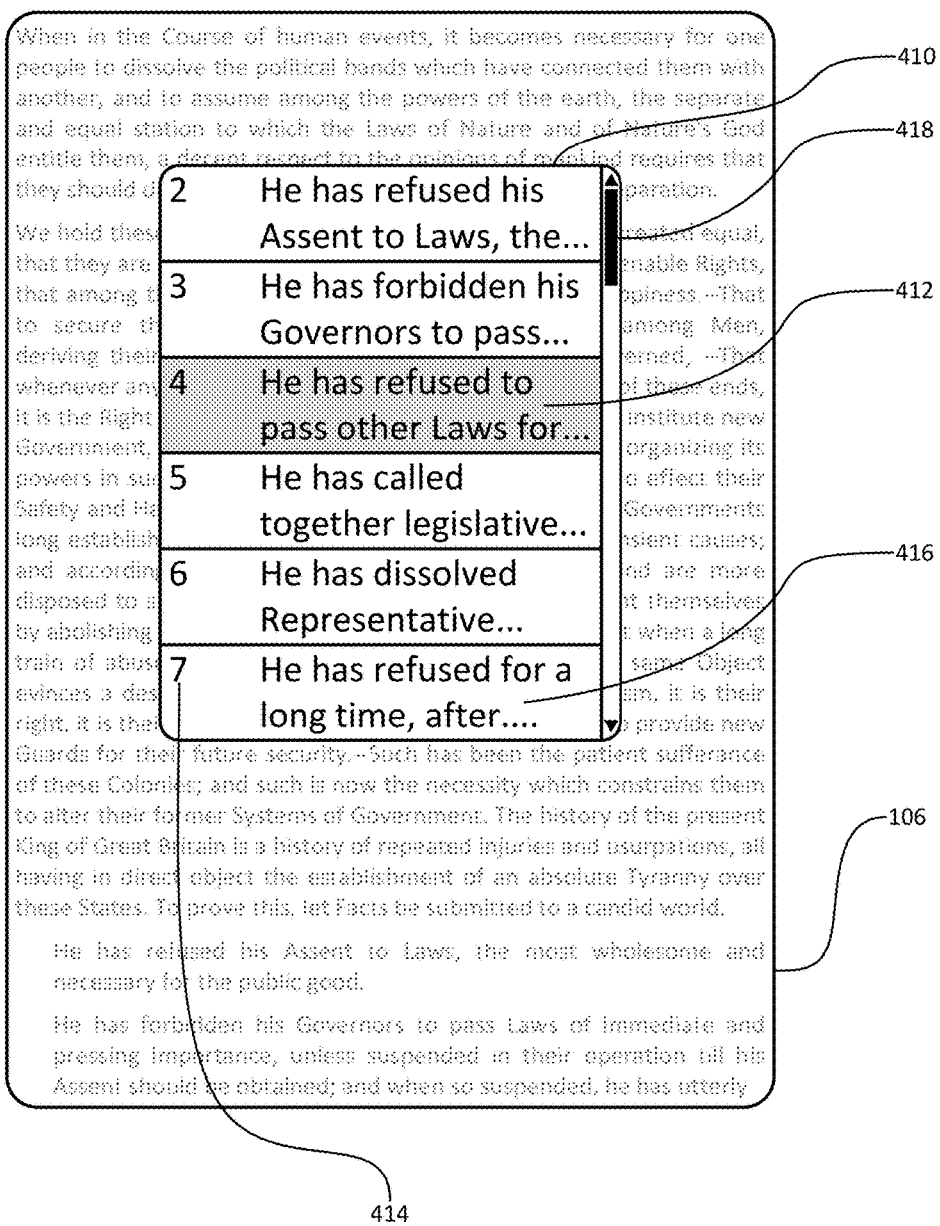
FIG. 5B is a schematic illustration of a screenshot of the user interface of the electronic touchscreen device illustrated in FIGS. 1A-1C, wherein the screenshot displays an example configuration of a bookmark navigation mode of a control overlay, in accordance with an embodiment of the present invention.

Both the bookmark navigation mode and the TOC navigation mode may optionally include a user interface that displays the available hyperlinks. FIG. 5B is a screenshot that schematically illustrates one embodiment of the bookmark navigation mode of the control overlay 230. This example embodiment includes a menu of hyperlinks 410 that includes a default or focused menu option that is indicated by highlighting 412, although other indicia such as a flashing background or a different typeface could be used additionally or alternatively. Where the number of bookmarks is greater than that which can conveniently be displayed on the touchscreen 106, a control such as a scroll bar 418 can optionally be used to access additional bookmarks which may not be initially displayed. In the illustrated example embodiment the bookmarks are sorted by page number 414 and are identified by a selected text segment 416 from the bookmarked page. Other identifying data and sorting techniques can be used in other embodiments. It will be appreciated that a menu of hyperlinks similar to that illustrated in FIG. 5B may be provided for the TOC navigation mode, although additional or alternative identifying information may be provided in a menu of TOC hyperlinks.

In the eyes-free mode, the user need not coordinate his or her control gestures with the physical configuration of the menu of hyperlinks 410; this advantageously allows the user to navigate the menu of hyperlinks 410 and select a hyperlink without actually looking at the touchscreen 106. Thus, it will be appreciated that the user interface illustrated in FIG. 5B is optional given that the eyes-free mode is configured for use in situations where looking at the device display is inconvenient, undesirable or impossible. Therefore, in certain modified embodiments the menu of hyperlinks 410 is not displayed, and the content stored on the device 100 is displayed while the user navigates through and selects from the available hyperlinks using audible feedback.

iii. Reference Resources Mode

In certain embodiments the menu provided in the options overlay 220 includes a word definition option 310. The word definition option 310 is an example of a context-sensitive menu option that could be provided in the first menu subsection 352 of the example embodiment illustrated in FIG. 4B. Selecting the word definition option 310 using the example menu gestures provided in Table B transitions the device 100 into a reference resources mode of the control overlay 230. The reference resources mode is one of a plurality of modes that may be included within the control overlay 230, as illustrated in FIG. 3. In such a mode the user may obtain reference information, such as a dictionary definition, relating to selected content. The reference information is not limited to dictionary definitions, but may include other appropriate reference information relating to the selected content, such as a thesaurus reference, an encyclopedia article, or an entry from a foreign language translation dictionary. The selected content can be, for instance, a word selected using the example navigation gestures provided in Table A, as applied in the manual mode 214 of the reading overlay 210, as described above. These gestures allow the user to select an individual word to be defined or otherwise researched using the reference resources mode.

Information obtained using the reference resources mode, such as a dictionary definition, may be provided audibly. For example, a dictionary definition may be read aloud using the speaker 108 in one embodiment. This allows the user to obtain the dictionary definition or other reference information without having to actually look at the device display. In embodiments wherein the reference information is provided audibly, the example navigation gestures provided in Table A may be used to navigate the TTS reading of the reference information. For example, a single-finger tap could be used to pause or resume the TTS reading of a dictionary definition, and a horizontal fling left or right could be used to navigate backward or forward within the dictionary definition by word, section or other segment. While providing the reference information audibly advantageously eliminates any need for the user to look at the device display, in other embodiments the information may additionally or alternatively be provided, for example, in a dialog box displayed on the touchscreen 106. When the user has finished listening to, reading or otherwise consuming the reference information, the user may leave the reference resources mode using, for example, a backward transition gesture 204 to transition back to the options overlay 220, or a reading overlay transition gesture 206 to transition directly back to the reading overlay 210.

iv. Spelling Mode

In certain embodiments the menu provided in the options overlay 220 includes a spelling option 312. The spelling option 312 is an example of a context-sensitive menu option that could be provided in the first menu subsection 352 of the example embodiment illustrated in FIG. 4B. Selecting the spelling option 312 using the example menu navigation gestures provided in Table B transitions the device 100 into a spelling mode of the control overlay 230. The spelling mode is one of a plurality of modes that may be included within the control overlay 230, as illustrated in FIG. 3. In such a mode the device 100 may provide a spelling and/or an alternative spelling associated with selected content. The selected content can be, for instance, a word selected using the example navigation gestures provided in Table A, as applied in the manual mode 214 of the reading overlay 210, as described above. These gestures allow the user to select an individual word to be spelled using the spelling mode. The spelling may be provided audibly, for example using traditional spelling bee rules wherein the word is stated, spelled letter-by-letter, and restated. This advantageously provides the user with the spelling of the selected word without requiring the user to actually look that the device display. Other methods of providing the spelling can be used in other embodiments. For example, one or more spellings of the word can additionally or alternatively be provided in a dialog box that is displayed on the touchscreen 106.

In a modified embodiment of the spelling mode, after the word is stated, spelled letter-by-letter and restated, the spelling mode may be configured to allow the user to perform character navigation on the selected word using navigation gestures such as horizontal swiping. For example, the device 100 can be configured to state a first or subsequent letter in response to a single-finger forward horizontal swipe, and could be further configured to state a previous letter in response to a single-finger backward horizontal swipe. Other gestures may be used for character navigation in other embodiments. In certain embodiments a gesture is associated with a command to pause the audible spelling. A unique tone or announcement may be played to indicate that the end of the word has been reached, or that an alternative spelling is available. Such a configuration advantageously provides the user with greater control over how the spelling of the word is provided. When the user has finished listening to, and optionally navigating through, the spelling of the selected word, the user may leave the spelling mode using, for example, a backward transition gesture 204 to transition back to the options overlay 220, or a reading overlay transition gesture 206 to transition directly back to the reading overlay 210.

v. Add Note Mode

In the example embodiment illustrated in FIG. 4B, the menu provided in the options overlay 220 includes an "add note" option. The add note option is an example of a context-sensitive menu option that could be provided in the first menu subsection 352, as illustrated in FIG. 4B. Selecting the add note option using the example menu navigation gestures provided in Table B transitions the device 100 into an add note mode of the control overlay 230. The add note mode is one of a plurality of modes that may be included within the control overlay 230, as illustrated in FIG. 3. In such a mode the user may create and save a note associated with a particular location within the content. However, in a modified embodiment the note may not be associated with any specific location within the content, in which case the add note option could be grouped with the global menu options that could be provided in the second menu subsection 354 illustrated in FIG. 4B. In one embodiment a voice note is recorded using a microphone, while in another embodiment a textual note is entered using a virtual keyboard provided on the display 106. In yet another embodiment the note includes both recorded voice content in addition to textual content and/or other types of content such as recorded video, graphical drawings, and the like. Thus other methods and devices may be used to input the note in other embodiments.

Figure 5C:
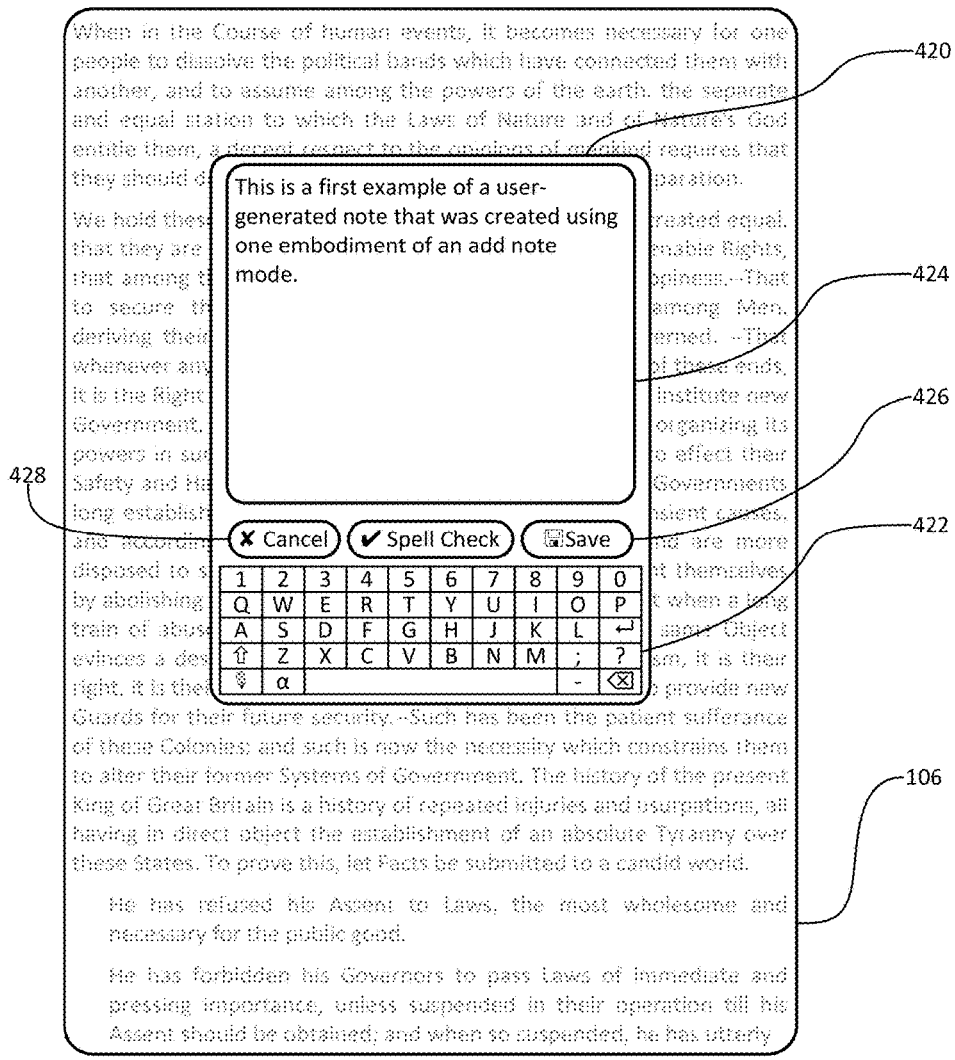
FIG. 5C is a schematic illustration of a screenshot of the user interface of the electronic touchscreen device illustrated in FIGS. 1A-1C, wherein the screenshot displays an example configuration of an add note mode of a control overlay, in accordance with an embodiment of the present invention.

The add note mode includes a user interface configured to facilitate entry of a new note. FIG. 5C is a screenshot that schematically illustrates one embodiment of the add note mode of the control overlay 230. This example embodiment includes a dialog box 420 having positioned therein a virtual keyboard 422 and a text entry box 424. In one embodiment the user may input a note using the virtual keyboard 422, although in other embodiments other entry methods may be used, such as a conventional keyboard coupled to the device 100 via a wired or wireless connection, or a microphone coupled with voice recognition software capable of transcribing words spoken by the user. Additional text entry dialog boxes are optionally proved to facilitate data entry corresponding to various data fields, such as title, author, creation date, expiration date, and the like.

The dialog 420 box optionally includes control buttons such as a save button 426 and a cancel button 428. Additional control buttons corresponding to additional functionality may be provided in other embodiments, such as a button for implementing a spell checker or a button for activating a voice transcription feature. However such control buttons are optional; in certain modified embodiments commands such as save, cancel or check spelling are invoked using gestures. For example, in one such embodiment the note can be saved using a single-finger double tap gesture, cancelled using a two-finger double tap gesture, and spell-checked using a three-finger double tap gesture. Other gestures can be associated with these or other commands in other embodiments. Command gestures associated with the add note mode are optionally detected and responded to without regard to the particular location on the touchscreen 106 where the gestures are made. Thus, even where location-sensitive single-finger tapping is used for text entry using the virtual keyboard, the command gestures may still be location insensitive.

When the user is finished creating the note, the note may be saved by tapping the save button 426 or otherwise invoking a save command using a location-insensitive save gesture. The note can be saved, for example, in the device RAM 140 and/or on a remote server that would facilitate access by other users and/or other devices. Alternatively, if the user wishes to close the note without saving, this can be accomplished by tapping the cancel button 428 or otherwise invoking a cancel command using a location-insensitive cancel gesture. In this case, the device 100 is optionally configured to display a confirmation dialog box prompting the user to confirm that he or she wishes to cancel the note entry without saving. In certain embodiments this request for confirmation is additionally or alternatively presented to the user audibly, and the user can respond to the confirmation request with an appropriate predefined gesture. The device can be transitioned back to the options overlay 220 or the reading overlay 210 after the note is saved or cancelled.

vi. Note Management Mode

In the example embodiment illustrated in FIG. 4B, the menu provided in the options overlay 220 includes a "go to notes" option. The go to notes option is an example of a global menu option that could be provided in the second menu subsection 354, as illustrated in FIG. 4B. Selecting the go to notes option using the example menu navigation gestures provided in Table B transitions the device 100 into a note management mode of the control overlay 230. The note management mode is one of a plurality of modes that may be included within the control overlay 230, as illustrated in FIG. 3. In such a mode the user may access functionality associated with notes embedded within content accessed using the device 100. For example, while some content may be initially generated with notes embedded therein, the previously described add notes mode can also be used to embed user-generated notes within the content.

Figure 5D:
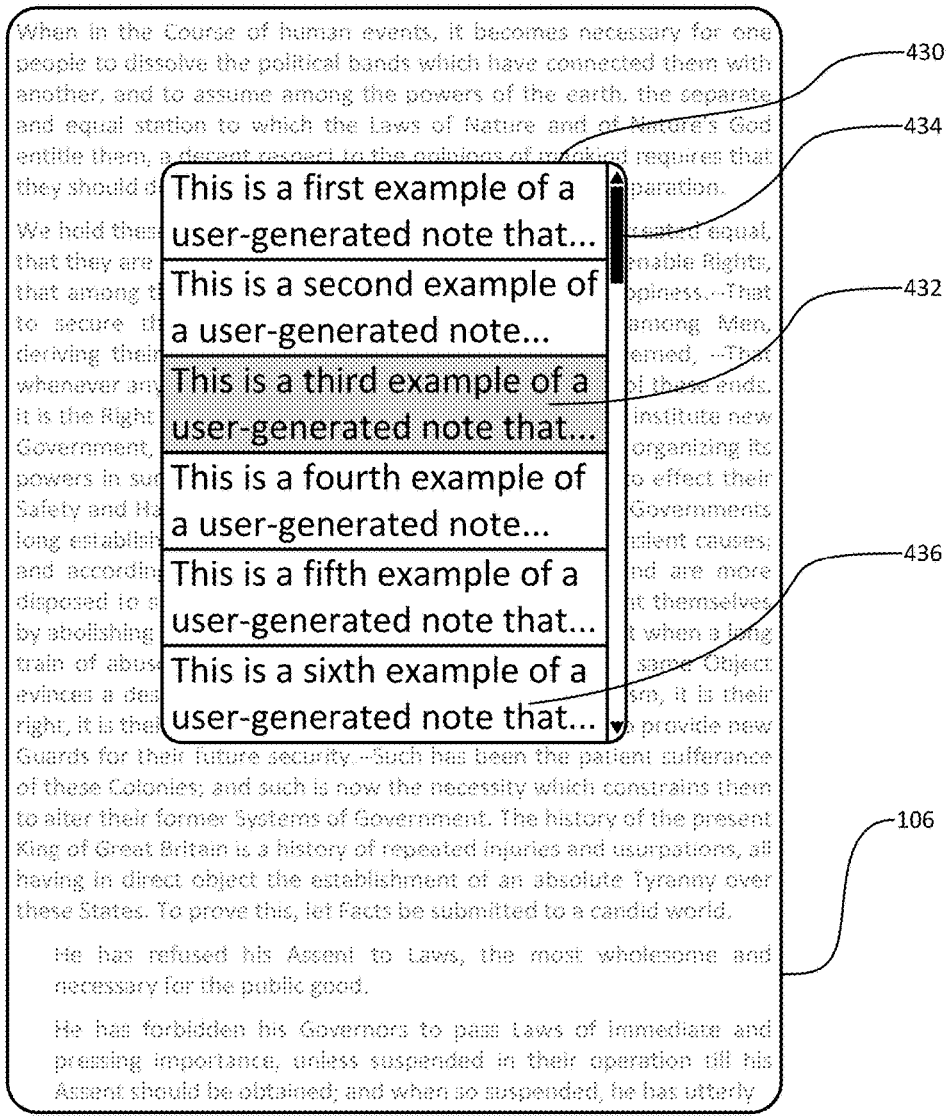
FIG. 5D is a schematic illustration of a screenshot of the user interface of the electronic touchscreen device illustrated in FIGS. 1A-1C, wherein the screenshot displays an example configuration of a note management mode of a control overlay, in accordance with an embodiment of the present invention.

The note management mode includes a user interface that displays notes and allows the user to perform actions such as note deletion and note modification. FIG. 5D is a screenshot that schematically illustrates one embodiment of the note management mode of the control overlay 230. This example embodiment includes a listing of notes 430 that includes a focused note indicated by highlighting 432, although other indicia such as an animated background or a different typeface could be used additionally or alternatively. Where the number of notes is greater than that which can conveniently be displayed on the touchscreen 106, a control such as a scroll bar 434 can optionally be used to access additional notes which may not be initially displayed. In the illustrated example embodiment the notes are identified by an initial text segment 436 of the note, although additional or alternative identifying information may be displayed in other embodiments, such as the creation date/time or the author of the note.

The listing of notes 430 can be navigated, and the individual notes can be selected, in similar fashion to the control menu 300 described above with respect to the control overlay 220, and therefore a detailed description of such navigation and selection techniques will not be repeated here. However, it will be appreciated that the listing of notes 430 can be used in a way that does not require the user to focus attention on the device display. For example, in one embodiment the device 100 is configured to read, using the speaker 108, a beginning segment of a note when that note is highlighted. The device 100 is also optionally configured to make an announcement such as "note x of y" as the user navigates through the listing of notes 430, where x is a selected note number and y is the total number of notes. Thus, it will be appreciated that the user interface illustrated in FIG. 5D is optional given that the eyes-free mode is configured for use in situations where looking at the device display is inconvenient, undesirable or impossible. Therefore, in certain modified embodiments the listing of notes 430 is not displayed, and the content stored on the device 100 is displayed while the user navigates through and selects from the notes using audible feedback. As a result, the user need not coordinate his or her control gestures with the physical configuration of the listing of notes 430 as illustrated in FIG. 5D.

After the user has navigated to a note such that the selected note is indicated by highlighting 432, additional gestures may be used to perform additional actions. As a first example, the device 100 can be configured to respond to a single-finger tap by opening a note editor that would allow the user to modify the selected note; an example of such an editor is illustrated in FIG. 5C and is described above with respect to the add note mode. As a second example, the device 100 can be configured to respond to a single-finger press-and-hold gesture by initiating a TTS reading of the selected note. As a third example, the device 100 can be configured to respond to a single-finger double tap by prompting the user to confirm that he or she wishes to delete the selected note; such a prompting can be made visually on the touchscreen 106 and/or audibly using the speaker 108. For instance, in one embodiment the audible deletion prompt states, "Would you like to delete this note? Double tap again to confirm, or single tap to cancel." As a fourth example of an additional action that could be performed in the note management mode, the device 100 could be configured to respond to a three-finger single tap by navigating to a location in the content that is associated with the selected note and transitioning to the reading overlay 210. The additional functions described here are provided as examples only, and the claimed invention is not intended to be limited to any particular functionality or set of functionalities in the note management mode. When the user has finished using the note management mode, the user may transition back to the options overlay 220 or the reading overlay 210 using an appropriate transition gesture.

vii. Search Mode

In the example embodiment illustrated in FIG. 4B, the menu provided in the options overlay 220 includes a "find selection" option and a "find new" option. The find selection option is an example of a context-sensitive menu option that could be provided in the first menu subsection 352, as illustrated in FIG. 4B. The find new option is an example of a global menu option that could be provided in the second menu subsection 354, as also illustrated in FIG. 4B. In other embodiments additional or alternative menu options relating to search functionality may be provided, such as a "find next" and/or "find previous" option. Selecting an option such as these using the example menu navigation gestures provided in Table B transitions the device 100 into a searching mode of the control overlay 230. The search mode is one of a plurality of modes that may be included within the control overlay 230, as illustrated in FIG. 3. In such a mode the device 100 is configured to present the user with a list of search results associated with a search string. In the case of the find selection option, the search string may be based on content saved in a virtual clipboard using the manual mode 214 of the reading overlay 210, as described above in Section D.2 of this specification. In the case of the find new option, a new search string may be received in the form of user input. For example, in certain embodiments the user may input the search string using a virtual keyboard displayed on the touchscreen 106, a physical keyboard connected to the device 100 via a wired or wireless connection, or using a microphone coupled with voice recognition software. The search results can be based on locating an exact match of the search string in the content stored on the device 100, or can be based on another search algorithm, such as a proximity search algorithm.

Figure 5E:
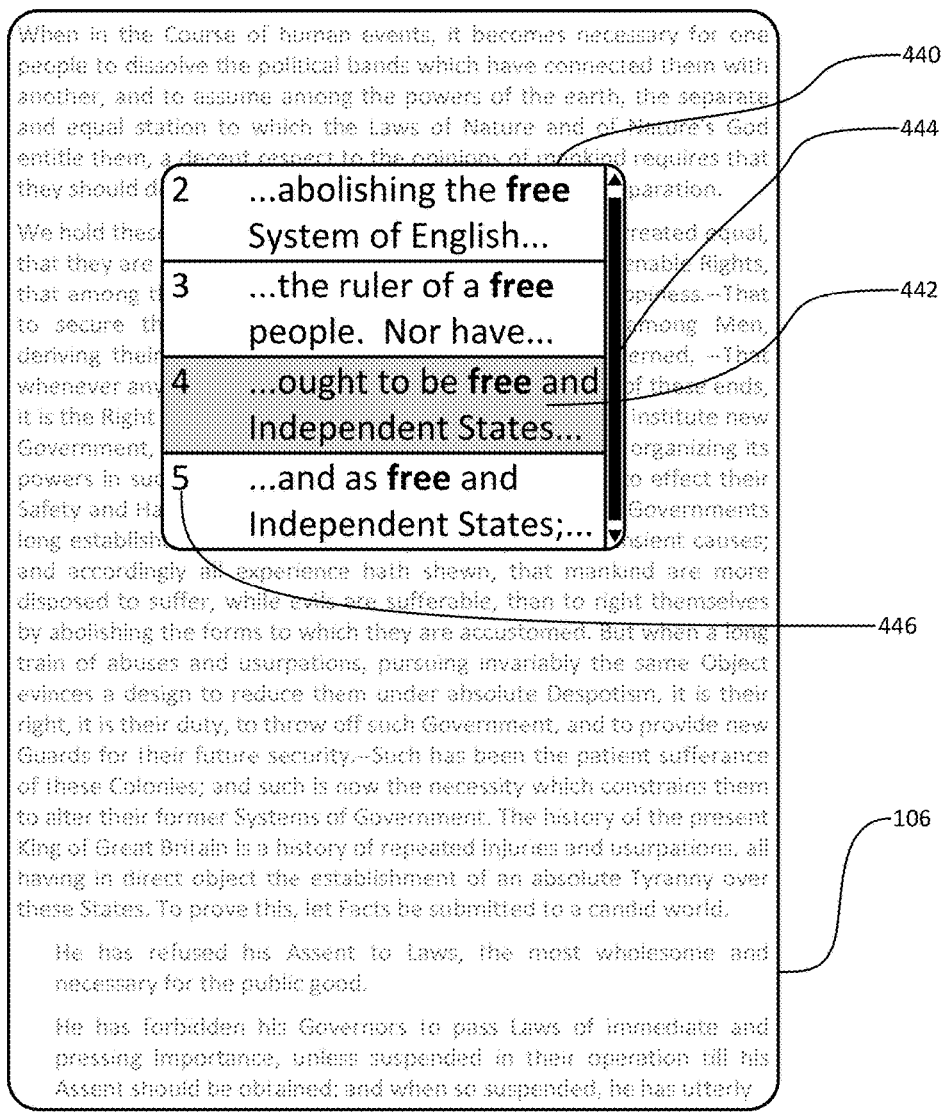
FIG. 5E is a schematic illustration of a screenshot of the user interface of the electronic touchscreen device illustrated in FIGS. 1A-1C, wherein the screenshot displays an example listing of search results generated using a search mode of a control overlay, in accordance with an embodiment of the present invention.

The search mode optionally includes a user interface configured to present the user with a list of search results based on the search string. FIG. 5E is a screenshot that schematically illustrates one embodiment of the search results generated using the search mode of the control overlay 230. This example embodiment includes a listing of search results 440 presented in the form of a hyperlinked menu. A default or focused menu option is indicated by highlighting 442, although other indicia such as a flashing background or a different typeface could be used additionally or alternatively. Where the number of search results is greater than that which can be conveniently displayed on the touchscreen 106, a control such as a scroll bar 444 can optionally be provided to access additional search results which may not be initially displayed. The search results can be sorted and/or indexed by page number 446, although they may be additionally or alternatively sorted and/or indexed by paragraph number, section number, or other document segment. Each search result optionally includes not only the search string ("free" in the illustrated embodiment), but also some context in which the search string occurs. In one embodiment of an eyes-free mode, the device 100 is configured to make an audible announcement using speaker 108 indicating the total number of search results found when the listing of search results 430 is initially presented on the touchscreen 106.

The listing of search results 440 can be presented using a menu displayed on the touchscreen 106, for example, and/or audibly using the speaker 108. This listing can be navigated, and the listed hyperlinks can be selected, in similar fashion to the control menu 300 described above with respect to the control overlay 220, and therefore a detailed description of such navigation and selection techniques will not be repeated here. However, it will be appreciated that the listing of search results 440 can be used in a way that does not require the user to focus attention on the device display. For example, in one embodiment the device 100 is configured to read, using the speaker 108, a segment of content surrounding the search string when a particular search result is highlighted. The device 100 is also optionally configured to make an announcement such as "search result x of y" as the user navigates through the listing of search results 440, where x is a selected search result number and y is the total number of search results. Thus, it will be appreciated that the user interface illustrated in FIG. 5E is optional given that the eyes-free mode is configured for use in situations where looking at the device display is inconvenient, undesirable or impossible. Therefore, in certain modified embodiments the listing of search results 440 is not displayed, and the content stored on the device 100 is displayed while the user navigates through and selects from the search results using audible feedback. However, regardless of whether the search results are displayed or not, the device 100 navigates directly to the linked content upon selection of a particular hyperlinked search result, and optionally transitions back to the reading overlay 210. Alternatively, one or more backward transition gestures can be used to dismiss the listing of search results 440 and transition back to the options overlay 220 and/or the reading overlay 210 without navigating the content stored on the device 100.

viii. Page Navigation Mode

In the example embodiment illustrated in FIG. 4B, the menu provided in the options overlay 220 includes a "go to page" option. The go to page option is an example of a global menu option that could be provided in the second menu subsection 352, as illustrated in FIG. 4B. Selecting the go to page option using the example menu navigation gestures provided in Table B transitions the device 100 into a page navigation mode of the control overlay 230. The page navigation mode is one of a plurality of modes that may be included within the control overlay 230, as illustrated in FIG. 3. In such a mode the user can indicate a target page number to which he or she wishes to navigate. In one embodiment of the page navigation mode, the target page number can be input using a virtual number pad displayed on the touchscreen 106. The virtual number pad is optionally configured to read aloud and/or display the numbers entered by the user, and may include additional virtual buttons such as a "clear" button that can be used to clear the entered number or a "go" button that can be used to submit the entered number. Optionally, the device can be configured to detect and respond to a global backward transition gesture that would cancel the page navigation mode and return the user to the options overlay 220. In an alternative embodiment, the user can enter the target page number to which he or she wishes to navigate as a relative page number, such as "+15" to indicate navigation forward by fifteen pages, or "−12" to indicate navigation backward by twelve pages. And while these examples use a virtual number pad to receive the user input, it will be recognized that the user input may be received in other ways that would not require the user to actually look at the device display, such as by a voice command received using a microphone and voice recognition software, or by using a subset of gestures that uniquely define the digits and symbols that could be used to enter a page number. In cases where an invalid page number or reference is received, the device 100 can be configured to display and/or play an appropriate error message. Regardless of how the user indicates the desired page number, the device 100 can be configured to navigate directly to the requested page and transition back to the reading overlay 210 upon receiving the user's input.

ix. Add/Delete Bookmark Option

As illustrated in FIG. 3, in certain embodiments the menu provided in the options overlay 220 includes an add/delete bookmark option 314. The add/delete bookmark option 314 is an example of a context-sensitive menu option that could be provided in the first menu subsection 352 of the example embodiment illustrated in FIG. 4B. Selecting the add/delete bookmark option 314 using the example menu navigation gestures provided in Table B allows the user to add or delete a bookmark associated with the current page. For instance, if there is no bookmark associated with the current page then selecting this option will add a bookmark; on the other hand if there is already a bookmark associated with the current page then selecting this option will remove that bookmark. The action of adding or deleting a bookmark is optionally accompanied by an audible announcement, such as "bookmark added" or "bookmark deleted". This provides a user with information regarding the bookmarked status of a given page in situations where it is difficult or impossible to look at the device display. A bookmark icon is optionally displayed on the selected page when a bookmark is added. Bookmarks can assist the user to navigate content stored on the device 100 in an eyes-free mode, as disclosed above in the context of the bookmark navigation mode.

E. EYES-FREE MODE METHODOLOGY EXAMPLES

FIGS. 6A-6F collectively illustrate several examples of how an eyes-free mode can be used to perform various tasks using an electronic device. These examples are provided in the context of an electronic device that has a touch sensitive surface and that is used to provide a TTS reading of content stored or otherwise available thereon. However, as will be appreciated in view of this disclosure, the eyes-free mode can be used in other applications (such as consumption of audio, video or other content), and using input devices other than a touch sensitive surface (such as a motion sensing camera, a microphone in conjunction with voice recognition software, or an internal accelerometer). Furthermore, the functions described here are provided as examples only, and the claimed invention is not intended to be limited to any particular functionality or set of functionalities. Likewise, the particular gestures and their corresponding actions are also provided as examples, and it will be appreciated that other gestures can be associated with these and other actions in different embodiments.

1. Define a Word

Figure 6A:
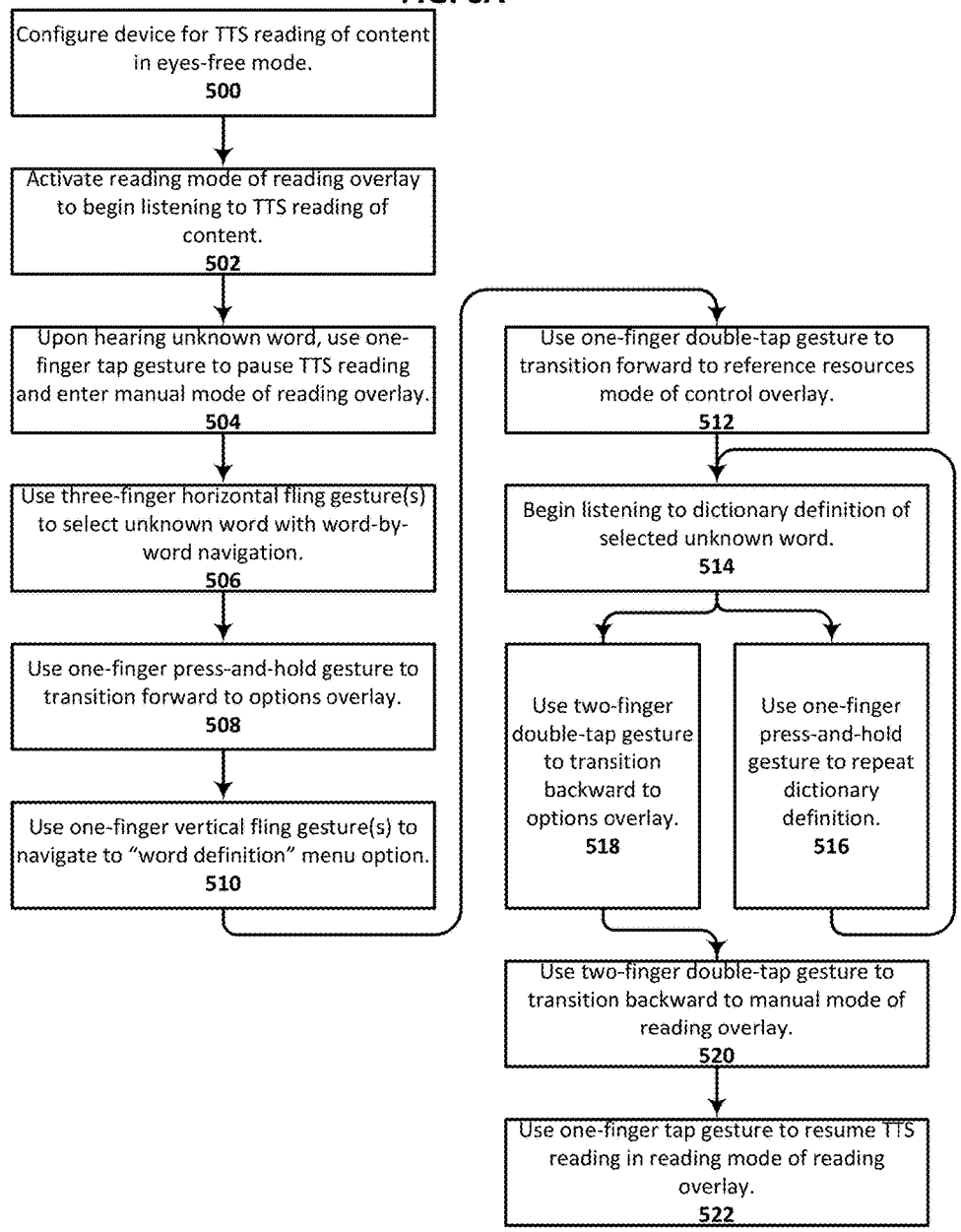
FIG. 6A is a flowchart illustrating an example methodology of how an eyes-free mode is used to define a word encountered in content stored on an electronic device, in accordance with an embodiment of the present invention.

FIG. 6A is a flowchart illustrating one embodiment of an example methodology of how an eyes-free mode is used to define a word encountered in content stored on an electronic device. In this example, the user first configures 500 the electronic device for TTS reading of content in an eyes-free mode, such as by selecting an appropriate option from a settings menu, invoking a voice-recognized command, or making a specific gesture on the touch sensitive surface. Once in the eyes-free mode, the user then activates 502 the reading mode of the reading overlay to begin listening to a TTS reading of content that is stored on, or otherwise available using, the electronic device. While listening to the TTS reading, the user gestures with a one-finger tap 504 to pause the TTS reading and enter the manual mode of the reading overlay. The TTS reading can be paused, for example, when the user hears an unknown word. Once the TTS reading is paused, the user gestures with a three-finger horizontal fling 506 to perform word-by-word navigation to the unknown word. If the unknown word is in a previous sentence (or other content segment), the user may also use a two-finger horizontal fling (or other navigation gesture) to navigate to the unknown word. Once the unknown word has been selected, the user gestures with a one-finger press-and-hold 508 to transition to the options overlay. Once in the options overlay, the user is presented with a menu listing several available functions. The user gestures with a one-finger vertical fling 510 to navigate to the "word definition" menu option. In embodiments where this menu option is a predetermined default menu option, the menu navigation 510 may be omitted. However, regardless of whether the word definition menu option is a default menu option, the user gestures with a one-finger double-tap 512 to transition forward to a reference resources mode of the control overlay. The user may then listen 514 to a dictionary definition of the selected unknown word.

While the user is listening to the dictionary definition, or alternatively after the dictionary definition has been fully read, the user may optionally gesture with a one-finger press-and-hold 516 to repeat the reading of the dictionary definition. Other content navigation gestures such as those listed in Table A may also be used to navigate the TTS reading of a dictionary definition or other reference material. Alternatively, the user may gesture with a two-finger double-tap 518 to transition backward to the options overlay. Once in the options overlay, the user may again gesture with a two-finger double-tap 520 to transition backward to the manual mode of the reading overlay. At that point, the user may gesture with a one-finger tap 522 to resume the TTS reading in the reading mode of the reading overlay.

It will be appreciated that the foregoing example method can also be adapted to obtain reference information other than a dictionary definition of a word. For instance, this method could be adapted to provide the user with a thesaurus reference, an encyclopedia article or an Internet search related to the selected word. Furthermore, because the gestures referred to in this example method can be detected and responded to without regard to the specific location on the touch sensitive surface where the gestures are made, this method advantageously allows the user to obtain the dictionary definition without actually looking at the device display.

2. Spell a Word

Figure 6B:
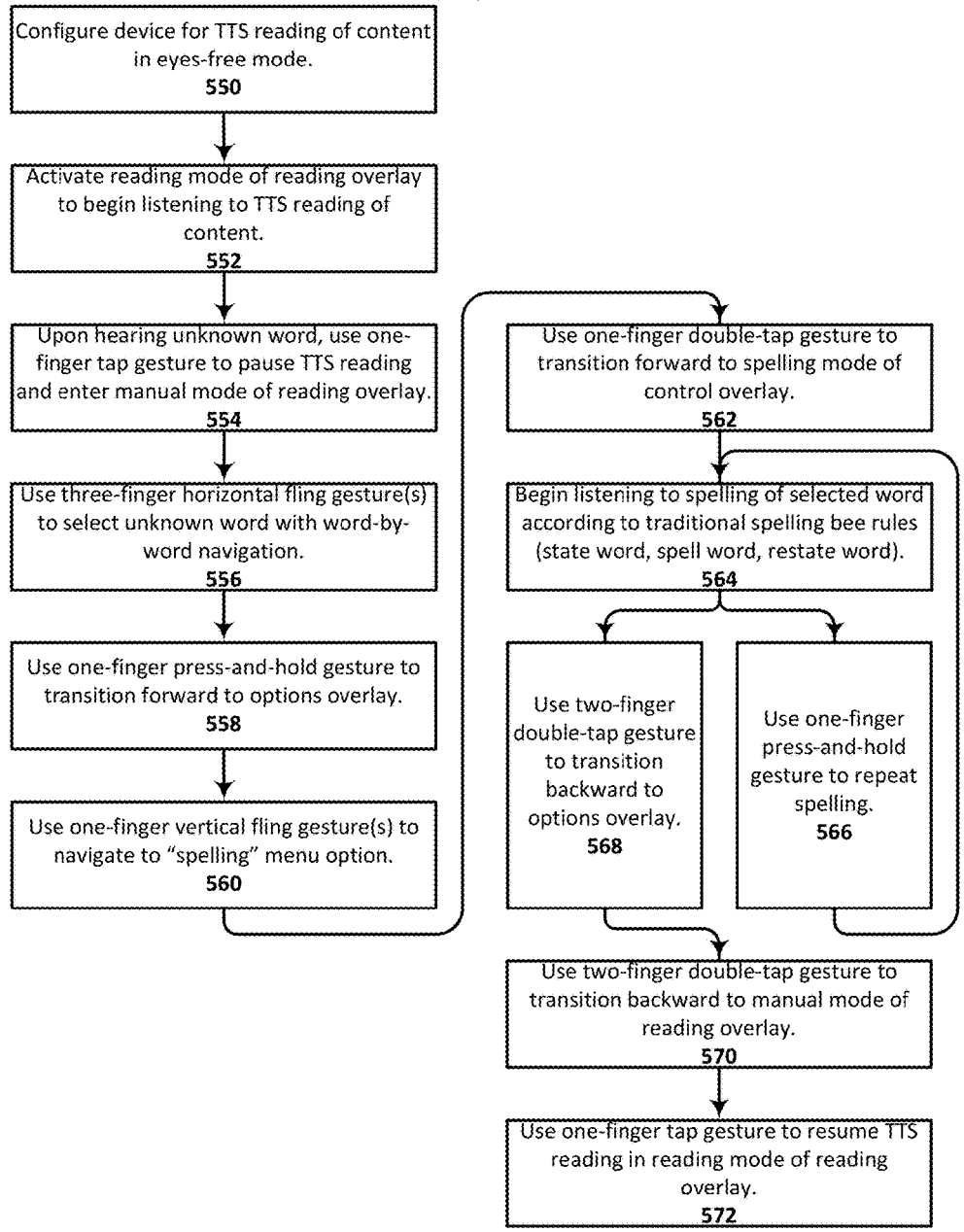
FIG. 6B is a flowchart illustrating an example methodology of how an eyes-free mode is used to spell a word encountered in content stored on an electronic device, in accordance with an embodiment of the present invention.

FIG. 6B is a flowchart illustrating one embodiment of an example methodology of how an eyes-free mode is used to spell a word encountered in content stored on an electronic device. In this example, the user first configures 550 the electronic device for TTS reading of content in an eyes-free mode, such as by selecting an appropriate option from a settings menu, invoking a voice-recognized command, or making a specific gesture on the touch sensitive surface. Once in the eyes-free mode, the user then activates 552 the reading mode of the reading overlay to begin listening to a TTS reading of content that is stored on, or otherwise available using, the electronic device. While listening to the TTS reading, the user gestures with a one-finger tap 554 to pause the TTS reading and enter the manual mode of the reading overlay. The ITS reading can be paused, for example, when the user hears an unknown word. Once the TTS reading is paused, the user gestures with a three-finger horizontal fling 556 to perform word-by-word navigation to the unknown word. If the unknown word is in a previous sentence (or other content segment), the user may also use a two-finger horizontal fling (or other navigation gesture) to navigate to the unknown word. Once the unknown word has been selected, the user gestures with a one-finger press-and-hold 558 to transition to the options overlay. Once in the options overlay, the user is presented with a menu listing several available functions. The user gestures with a one-finger vertical fling 560 to navigate to the "spelling" menu option. The user then gestures with a one-finger double-tap 562 to transition forward to a reference resources mode of the control overlay. The user may then listen 564 to the spelling of the selected unknown word. In one embodiment, the spelling is optionally provided according to traditional spelling bee rules (state word, spell word, restate word).

While the user is listening to the spelling, or alternatively after the spelling has been completed, the user may optionally navigate the spelled word on a letter-by-letter basis using a horizontal fling gesture. In a modified embodiment, during the spelling or after the spelling is complete, the user may gesture with a one-finger press-and-hold 566 to repeat the spelling. The user may optionally pause the audible spelling by making another predetermined gesture. Alternatively, the user may gesture with a two-finger double-tap 568 to transition backward to the options overlay. Once in the options overlay, the user may again gesture with a two-finger double-tap 570 to transition backward to the manual mode of the reading overlay. At that point, the user may gesture with a one-finger tap 572 to resume the TTS reading in the reading mode of the reading overlay. Because the gestures referred to in this example method can be detected and responded to without regard to the specific location on the touch sensitive surface where the gestures are made, this method advantageously allows the user to obtain the spelling of an unknown word without actually looking at the device display.

3. Add a Note

FIG. 6C is a flowchart illustrating one embodiment of an example methodology of how an eyes-free mode is used to embed a note in content stored on an electronic device. In this example, the user first configures 600 the electronic device for TTS reading of content in an eyes-free mode, such as by selecting an appropriate option from a settings menu, invoking a voice-recognized command, or making a specific gesture on the touch sensitive surface. Once in the eyes-free mode, the user then activates 602 the reading mode of the reading overlay to begin listening to a TTS reading of content that is stored on, or otherwise available using, the electronic device. While listening to the TTS reading, the user gestures with a one-finger tap 604 to pause the TTS reading and enter the manual mode of the reading overlay. The TTS reading can be paused, for example, at a point where the user wishes to embed a note in the content stored on the electronic device. Once the TTS reading is paused, the user gestures with a one-finger press-and-hold 606 to transition to the options overlay. Once in the options overlay, the user is presented with a menu listing several available functions. The user gestures with a one-finger vertical fling 608 to navigate to the "add note" menu option. The user then gestures with a one-finger press-and-hold 610 to transition forward to an add note mode of the control overlay. In one embodiment of the add note mode, the user is presented with a virtual keyboard, such as that illustrated in FIG. 5C, that may be used to enter text 612. In other embodiments the user may additionally or alternatively enter text using a method that does not require the user to look at a touchscreen, such as by using a microphone in conjunction with voice recognition software, or by using a subset of gestures that uniquely define the individual letters or symbols used for text entry.

While in the add note mode of the control overlay, the user may gesture with a one-finger double-tap 614 to save the note and transition backward to the manual mode of the reading overlay. Alternatively, the user may gesture with a two-finger double-tap 616 to cancel entry of the note without saving. In this case, the user is optionally presented with a dialog box where he or she can either (a) gesture with a two-finger double-tap 618 to confirm the cancellation and transition backward to the manual mode of the reading overlay; or (b) gesture with a one-finger tap 620 to continue entering text. Once in the manual mode of the reading overlay, the user may gesture with a one-finger tap 622 to resume the TTS reading in the reading mode of the reading overlay. Because the gestures referred to in certain embodiments of this example method can be detected and responded to without regard to the specific location on the touch sensitive surface where the gestures are made, such embodiments of this method advantageously allow the user to embed a note in content stored in the electronic device without actually looking at the device display.

4. View, Edit or Delete a Note

Figure 6D:
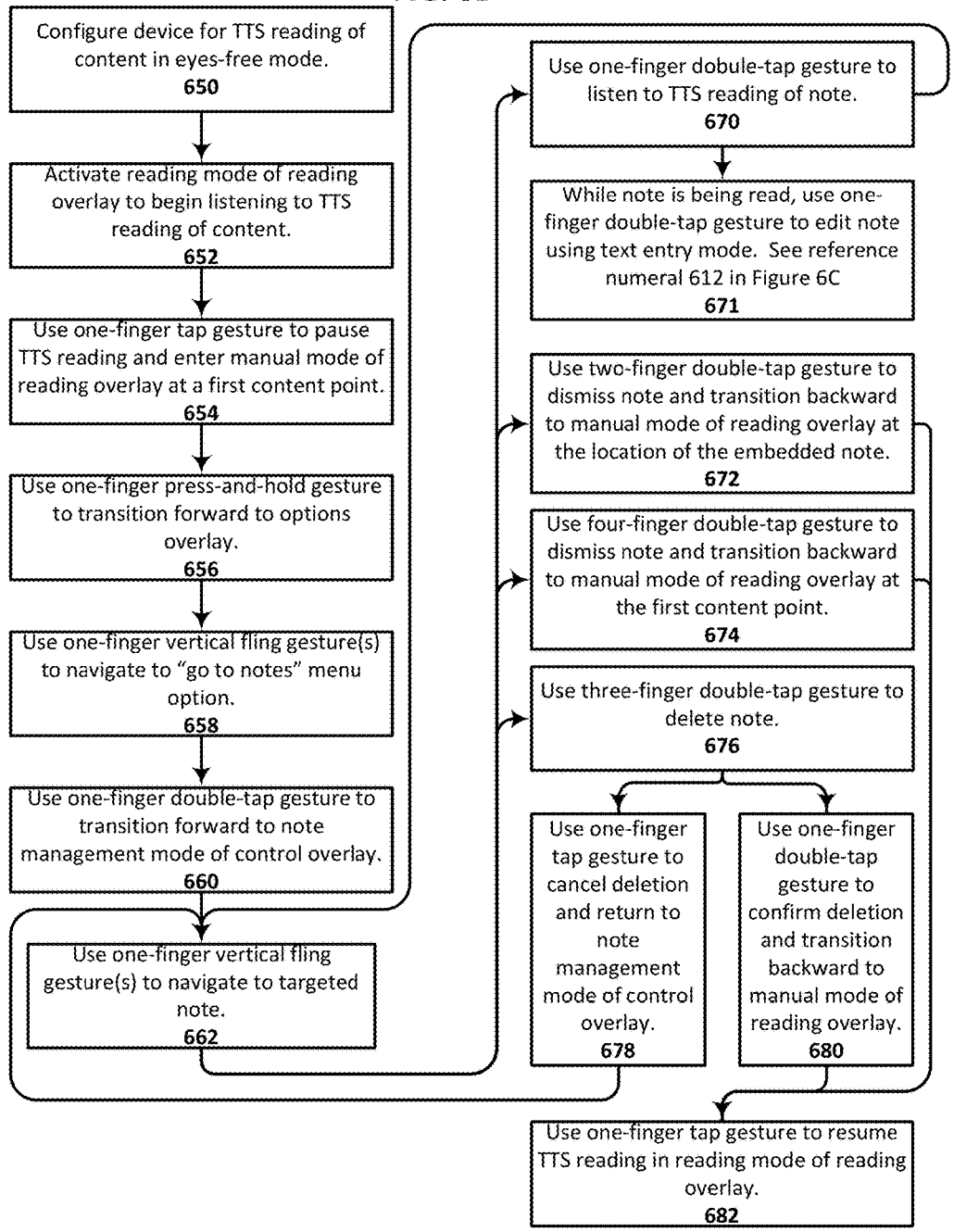
FIG. 6D is a flowchart illustrating an example methodology of how an eyes-free mode is used to view, edit and/or delete a note embedded in content stored on an electronic device, in accordance with an embodiment of the present invention.

FIG. 6D is a flowchart illustrating one embodiment of an example methodology of how an eyes-free mode is used to view, edit and/or delete a note embedded in content stored on an electronic device. In this example, the user first configures 650 the electronic device for TS reading of content in an eyes-free mode, such as by selecting an appropriate option from a settings menu, invoking a voice-recognized command, or making a specific gesture on the touch sensitive surface. Once in the eyes-free mode, the user then activates 652 the reading mode of the reading overlay to begin listening to a TTS reading of content that is stored on, or otherwise available using, the electronic device. While listening to the TTS reading, the user gestures with a one-finger tap 654 to pause the TTS reading at a first content point and enter the manual mode of the reading overlay. Once the TTS reading is paused, the user gestures with a one-finger press-and-hold 656 to transition to the options overlay. Once in the options overlay, the user is presented with a menu listing several available functions. The user gestures with a one-finger vertical fling 658 to navigate to the "go to notes" menu option. The user then gestures with a one-finger double-tap 660 to transition forward to a note management mode of the control overlay. In one embodiment of the note management mode, the user is presented with a listing of notes embedded in the content that is currently subject to the TTS reading. In other embodiments the user may be presented with a listing of notes in additional content saved or otherwise available on the electronic device. The user gestures with a one-finger vertical fling 662 to navigate the listing of notes and highlight or otherwise indicate a targeted note.

Once the user has navigated to a targeted note, a variety of different actions can be undertaken. For example, the user may gesture with a one-finger double-tap 670 to listen to a TTS reading of the note. During the TTS reading, the user has the option to again gesture with a one-finger double-tap 671 to edit the note using a text entry mode, such as by using the virtual keypad or the voice recognition system described above with respect to the technique for adding a note. As another example of an action which can be invoked once the user has navigated to a targeted note, the user may gesture with a two-finger double-tap 672 to dismiss the note and transition backward to the manual mode of the reading overlay at the embedded location of the note. Alternatively, the user may gesture with a four-finger double-tap 674 to dismiss the note and instead transition backward to the manual mode of the reading overlay at the first content point where the user initially paused the TTS reading of the content. The user may gesture with a three-finger double-tap 676 to invoke a delete command. In this case, the user is optionally presented with a dialog box where he or she can either (a) gesture with a one-finger tap 678 to cancel the deletion request and return to the note management mode of the control overlay, or (b) gesture with a one-finger double tap 680 to confirm the deletion request and transition backward to the manual mode of the reading overlay. Once in the manual mode of the reading overlay, the user may gesture with a one-finger tap 682 to resume the TTS reading in the reading mode of the reading overlay. Because the gestures referred to in certain embodiments of this example method can be detected and responded to without regard to the specific location on the touch sensitive surface where the gestures are made, such embodiments of this method advantageously allow the user to manage notes embedded in content stored in the electronic device without actually looking at the device display.

5. Find a Word

FIG. 6E is a flowchart illustrating one embodiment of an example methodology of how an eyes-free mode is used to find a word of interest in content stored on an electronic device. In this example, the user first configures 700 the electronic device for TTS reading of content in an eyes-free mode, such as by selecting an appropriate option from a settings menu, invoking a voice-recognized command, or making a specific gesture on the touch sensitive surface. Once in the eyes-free mode, the user then activates 702 the reading mode of the reading overlay to begin listening to a TTS reading of content that is stored on, or otherwise available using, the electronic device. While listening to the TTS reading, the user gestures with a one-finger tap 704 to pause the TES reading and enter the manual mode of the reading overlay. The TTS reading can be paused, for example, when the user hears a word of interest. Once the TTS reading is paused, the user gestures with a three-finger horizontal fling 706 to perform word-by-word navigation to the word of interest. If the word of interest is in a previous sentence (or other content segment), the user may also use a two-finger horizontal fling (or other navigation gesture) to navigate to the unknown word. If the user wishes to search for a sentence or phrase, the user may select the target sentence or phrase by navigating to the target sentence or phrase without performing further word-by-word navigation. Once the unknown word has been selected, the user gestures with a one-finger press-and-hold 708 to transition to the options overlay. Once in the options overlay, the user is presented with a menu listing several available functions. The user gestures with a one-finger vertical fling 710 to navigate to the "find selection" menu option. The user gestures with a one-finger double-tap 712 to transition forward to a searching mode of the control overlay. In one embodiment of the searching mode, the user is presented with a listing of instances of the word of interest in the content that is currently subject to the TTS reading. In other embodiments the user may be presented with a listing of instances of the word of interest in additional content saved or otherwise available on the electronic device. The user gestures with a one-finger vertical fling 714 to navigate the listing of instances.

As the user navigates the listing of instances, certain actions can be undertaken. For example, if the user gestures with a two-finger double-tap 716, the electronic device can be configured to transition backward to the options overlay, and if the user again gestures with a two-finger double-tap 718, the electronic device can be configured to transition backward again to the manual mode of the reading overlay. On the other hand, if the user gestures with a one-finger double-tap 720 while a selected instance of the word of interest is highlighted, the electronic device can be configured to navigate to the selected instance and transition backward to the manual mode of the reading overlay. Thus, the searching mode of the control overlay can be used to navigate to the location of selected search results within the content stored or otherwise available on the electronic device. Once in the manual mode of the reading overlay, the user may gesture with a one-finger tap 722 to resume the TTS reading in the reading mode of the reading overlay. Because the gestures referred to in certain embodiments of this example method can be detected and responded to without regard to the specific location on the touch sensitive surface where the gestures are made, such embodiments of this method advantageously allow the user to find and navigate to words of interest in content stored in the electronic device without actually looking at the device display.

6. Page Navigation

FIG. 6F is a flowchart illustrating one embodiment of an example methodology of how an eyes-free mode is used to navigate to a target page within content stored on an electronic device. In this example, the user first configures 750 the electronic device for TTS reading of content in an eyes-free mode, such as by selecting an appropriate option from a settings menu, invoking a voice-recognized command, or making a specific gesture on the touch sensitive surface. Once in the eyes-free mode, the user then activates 752 the reading mode of the reading overlay to begin listening to a TTS reading of content that is stored on, or otherwise available using, the electronic device. While listening to the TTS reading, the user gestures with a one-finger tap 754 to pause the TTS reading and enter the manual mode of the reading overlay. Once the TTS reading is paused, the user gestures with a one-finger press-and-hold 756 to transition to the options overlay. Once in the options overlay, the user is presented with a menu listing several available functions. The user gestures with a one-finger vertical fling 758 to navigate to the "go to page" menu option. The user then gestures with a one-finger double-tap 760 to transition forward to a page navigation mode of the control overlay. In one embodiment of the page navigation mode, the user is presented with a virtual number pad that may be used to enter 762 a target page number or a page navigation command. In other embodiments the user may additionally or alternatively enter target page number or a page navigation command using a method that does not require the user to look at a touchscreen, such as by using a microphone in conjunction with voice recognition software, or by using a subset of gestures that uniquely define the digits and symbols that could be used to enter a page number.

While in the page navigation mode of the control overlay, the user may enter a target page number and select 764 a "go" button to navigate to the target page number and transition backward to the manual mode of the reading overlay. Alternatively, the user can gesture with a one-figure double tap to accept the entered target page number. If the user makes a mistake in entering the target page number, or if a voice command is not accurately recognized, the user may select 770 a "delete" button to clear the erroneous input and reenter the target page number. Alternatively, the user can gesture with a three-finger double tap to clear to erroneous input and reenter the target page number. In addition, the user may gesture with a two-finger double-tap 766 to cancel the page navigation mode and transition backward to the options overlay, and if the user again gestures with a two-finger double-tap 768, the electronic device can be configured to transition backward again to the manual mode of the reading overlay. Once in the manual mode of the reading overlay, the user may gesture with a one-finger tap 772 to resume the TTS reading in the reading mode of the reading overlay. Because the gestures referred to in certain embodiments of this example method can be detected and responded to without regard to the specific location on the touch sensitive surface where the gesture is made, such embodiments of this method advantageously allow the user to perform page navigation in content stored in the electronic device without actually looking at the device display.

F. CONCLUSION

Numerous variations and configurations will be apparent in light of this disclosure. For instance, one example embodiment provides a device that includes a touch sensor for detecting gestures made by a user and a user interface. The user interface includes a content delivery mode in which digital content is delivered to the user. The user interface is configured to respond to a first set of command gestures. The user interface further includes a manual mode in which delivery of the digital content is paused, and in which the user interface is configured to respond to a second set of command gestures. The second set of command gestures includes more command gestures than the first set of command gestures. The first and second sets of command gestures are responded to without regard to a particular location on the touch sensor where a particular gesture is detected. In some cases, the first set of command gestures comprises a transition command gesture that is configured to toggle the user interface back-and-forth between the content delivery and manual modes. In some cases, the first set of command gestures consists essentially of a transition command gesture that is configured to toggle the user interface back-and-forth between the content delivery and manual modes. In some cases, (a) the first and second sets of command gestures each comprises a transition command gesture that is configured to toggle the user interface back-and-forth between the content delivery and manual modes; and (b) the transition command gesture in the first set of command gestures is equivalent to the transition command gesture in the second set of command gestures. In some cases, the device further comprises a speaker, wherein in the content delivery mode the digital content is delivered to the user via the speaker. In some cases, (a) the second set of command gestures comprises a content navigation gesture; and (b) detection of the content navigation gesture in the manual mode causes a segment of the digital content to be re-delivered to the user. In some cases, (a) the second set of command gestures comprises a content navigation gesture; (b) detection of the content navigation gesture in the manual mode causes a segment of the digital content to be re-delivered to the user; and (c) the first set of command gestures does not include the content navigation gesture. In some cases, (a) the second set of command gestures comprises a content navigation gesture; and (b) detection of the content navigation gesture in the manual mode causes a segment of the digital content to be highlighted on a display of the device. In some cases, the device further comprises a text-to-speech module, wherein in the content delivery mode the digital content is converted to an audio signal using the text-to-speech module. In some cases, (a) the device is selected from the group consisting of an e-reader, a tablet computer and a smart phone; and (b) the touch sensor is a touch sensitive display. In some cases, (a) the user interface further includes an options overlay; (b) the second set of command gestures includes a forward transition gesture that, when detected by the touch sensor, causes the device to transition to the options overlay; and (c) upon transitioning to the options overlay the user interface is further configured to provide for display a plurality of command options.

Another example embodiment of the present invention provides a mobile electronic device. The mobile electronic device includes a touch sensitive display for displaying digital content and detecting gestures made by a user. The mobile electronic device further includes a speaker. The mobile electronic device further includes a text-to-speech module. The mobile electronic device further includes a user interface having a reading mode in which the text-to-speech module converts the displayed digital content into an audio signal that is played using the speaker. The user interface also has a manual mode in which the playing of the audio signal generated by the text-to-speech module is paused. The user interface is configured to respond to a first set of command gestures detected by the touch sensitive display while in the reading mode. The user interface is configured to respond to a second set of command gestures detected by the touch sensitive display while in the manual mode. The first set of command gestures includes fewer command gestures than the second set of command gestures. The first and second sets of command gestures are responded to without regard to a particular location on the touch sensitive display where a particular gesture is detected. A transition command gesture is included in both the first and second set of command gestures. The transition command gesture is configured to toggle the user interface back-and-forth between the reading and manual modes. In some cases, the speaker plays an announcement upon detection of the transition command gesture. In some cases, the first set of command gestures consists essentially of the transition command gesture. In some cases, (a) the second set of command gestures comprises a content navigation gesture; and (b) detection of the content navigation gesture in the manual mode causes a segment of the digital content to be read using the text-to-speech module and the speaker. In some cases, (a) the second set of command gestures comprises a content navigation gesture; and (b) detection of the content navigation gesture in the manual mode causes a segment of the digital content to be copied to a virtual clipboard.

Another example embodiment of the present invention provides a non-transitory computer readable medium encoded with instructions that, when executed by at least one processor, cause an eyes-free control process to be carried out. The control process comprises providing a touch sensitive user interface having a reading mode and a manual mode. The control process further comprises aurally presenting digital content in the reading mode. The control process further comprises pausing the aural presentation in the manual mode. The control process further comprises responding to a first set of command gestures when the user interface is in the reading mode. The control process further comprises responding to a second set of command gestures when the user interface is in the manual mode. The first and second sets of command gestures are responded to without regard to a particular location on a touch sensor where a particular gesture is detected. A transition command gesture is included in both the first and second set of command gestures. The transition command gesture is configured to toggle the user interface back-and-forth between the reading and manual modes. In some cases, the first set of command gestures includes fewer commands than the second set of command gestures. In some cases, the control process further comprises making an audible announcement upon detection of the transition command gesture. In some cases, the touch sensor is a touch sensitive display.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:
1. A device comprising:
a touch sensitive display for detecting gestures made by a user; and
a user interface including
 (a) a reading overlay in which digital content is delivered to the user aurally, and in which the user interface is configured to respond to a forward transition gesture,
 (b) an options overlay which is displayed in response to detection of the forward transition gesture in the reading overlay, and in which
  (i) aural delivery of the digital content is paused,
  (ii) a plurality of command options are arranged in a vertically-oriented list displayed on the touch sensitive display,
  (iii) the options overlay responds to a vertical swipe menu navigation gesture that does not touch the vertically-oriented list and that identifies one of the command options by generating an audible announcement of the identified command option, wherein the vertical swipe menu navigation gesture must be performed multiple times to scroll through multiple items listed in the vertically-oriented list, and
  (iv) the options overlay responds to the forward transition gesture by invoking a command option that was identified by the vertical swipe menu navigation gesture, and

(c) a control overlay which is displayed in response to detection of the forward transition gesture in the options overlay, and which displays a plurality of control options corresponding to the invoked command option, wherein detection, at a location that is anywhere on the touch sensitive display, of the forward transition gesture in the options overlay results in a response that is independent of the location on the touch sensitive display where the forward transition gesture was detected, the location encompassing all portions of the touch sensitive display that are contacted by the forward transition gesture;

wherein the reading overlay is displayed in response to detection, at a location that is anywhere on the touch sensitive display, of at least one of a single-level backward transition gesture in the options overlay, and a multilevel backward transition gesture in the control overlay;

wherein the options overlay is also displayed in response to detection of the single-level backward transition gesture in the control overlay; and wherein the same forward transition gesture is used to transition from the reading overlay to the options overlay, and from the options overlay to the control overlay; and wherein the same single-level backward transition gesture is used to transition from the control overlay to the options overlay, and from the options overlay to the reading overlay.

2. The device of claim 1, wherein, when in the reading overlay, the user interface is further responsive to a reading mode transition gesture that is configured to toggle the user interface back-and-forth between a reading mode and a manual mode.

3. The device of claim 1, further comprising a speaker, wherein in the reading overlay the digital content is delivered to the user via the speaker.

4. The device of claim 1, wherein detection of a content navigation gesture in a manual mode of the reading overlay causes a segment of the digital content to be re-delivered to the user.

5. The device of claim 1, wherein:
detection of a content navigation gesture in a manual mode of the reading overlay causes a segment of the digital content to be re-delivered to the user; and
the re-delivered segment of digital content is selected from a group consisting of a word, a line, a sentence, and a paragraph.

6. The device of claim 1, wherein detection of a content navigation gesture in a manual mode of the reading overlay causes a segment of the digital content to be highlighted on the touch sensitive display.

7. The device of claim 1, further comprising a text-to-speech module, wherein in the reading overlay the digital content is converted to an audio signal using the text-to-speech module.

8. The device of claim 1, wherein: the device is selected from a group consisting of an e-reader, a tablet computer and a smart phone.

9. A mobile electronic device comprising:
a touch sensitive display for displaying digital content and detecting gestures made by a user;
a speaker;
a text-to-speech module; and
a user interface including (a) a reading overlay in which the text-to-speech module converts the displayed digital content into an audio signal that is played using the speaker, and in which the user interface is configured to respond to a forward transition gesture, (b) an options overlay which is displayed in response to detection of the forward transition gesture in the reading overlay, and in which
(i) playing of the audio signal generated by the text-to-speech module is paused,
(ii) a plurality of command options are arranged in a vertically-oriented list displayed on the touch sensitive display,
(iii) the options overlay responds to a vertical swipe menu navigation gesture that does not touch the vertically-oriented list and that identifies one of the command options by generating a first audible announcement of the identified command option, wherein the vertical swipe menu navigation gesture must be repeated multiple times to scroll through multiple items listed in the vertically-oriented list, and
(iv) the options overlay responds to the forward transition gesture by invoking a command option that was identified by the vertical swipe menu navigation gesture, and (c) a control overlay which is displayed in response to detection of the forward transition gesture in the options overlay, and which displays a plurality of control options corresponding to the invoked command option, wherein detection, at a location that is anywhere on the touch sensitive display, of the forward transition gesture in the options overlay results in a response that is independent of the location on the touch sensitive display where the forward transition gesture was detected, the location encompassing all portions of the touch sensitive display that are contacted by the forward transition gesture;

wherein the reading overlay is displayed in response to detection, at a location that is anywhere on the touch sensitive display, of at least one of a single-level backward transition gesture in the options overlay, and a multilevel backward transition gesture in the control overlay;

wherein the options overlay is also displayed in response to detection of the single-level backward transition gesture in the control overlay; and wherein the same forward transition gesture is used to transition from the reading overlay to the options overlay, and from the options overlay to the control overlay; and wherein the same single-level backward transition gesture is used to transition from the control overlay to the options overlay, and from the options overlay to the reading overlay.

10. The mobile electronic device of claim 9, wherein the options overlay further responds to the forward transition gesture by using the speaker to play a second audible announcement of the invoked command option.

11. The mobile electronic device of claim 9, wherein detection of a content navigation gesture in a manual mode of the reading overlay causes a segment of the digital content to be read using the text-to-speech module and the speaker.

12. The mobile electronic device of claim 9, wherein detection of a content navigation gesture in a manual mode of the reading overlay causes a segment of the digital content to be copied to a virtual clipboard.

13. A non-transitory computer readable medium encoded with instructions that, when executed by at least one processor, cause an eyes-free control process to be carried out, the control process comprising: providing a touch sensitive display that includes a user interface having
   (a) a reading overlay in which an aural presentation of digital content is made, and in which the user interface is configured to respond to a forward transition gesture,
   (b) an options overlay which is displayed in response to detection of the forward transition gesture in the reading overlay, and in which
      (i) the aural presentation of the digital content is paused,
      (ii) a plurality of command options are arranged in a vertically-oriented list displayed on the touch sensitive display,
      (iii) the options overlay responds to a vertical swipe menu navigation gesture that does not touch the vertically-oriented list and that identifies one of the command options by generating a first audible announcement of the identified command option, wherein the vertical swipe menu navigation gesture must be performed multiple times to scroll through multiple items listed in the vertically-oriented list, and
      (iv) the options overlay responds to the forward transition gesture by invoking a command option that was identified by the vertical swipe menu navigation gesture, and
   (c) a control overlay which is displayed in response to detection of the forward transition gesture in the options overlay, and which displays a plurality of control options corresponding to the invoked command option,
   wherein detection, at a location that is anywhere on the touch sensitive display, of the forward transition gesture in the options overlay results in a response that is independent of the location on the touch sensitive display where the forward transition gesture is detected, the location encompassing all portions of the touch sensitive display that are contacted by the forward transition gesture;
   wherein the reading overlay is displayed in response to detection, at a location that is anywhere on the touch sensitive display, of at least one of a single-level backward transition gesture in the options overlay, and a multilevel backward transition gesture in the control overlay;
   wherein the options overlay is also displayed in response to detection of the single-level backward transition gesture in the control overlay; and
   wherein the same forward transition gesture is used to transition from the reading overlay to the options overlay, and from the options overlay to the control overlay; and
   wherein the same single-level backward transition gesture is used to transition from the control overlay to the options overlay, and from the options overlay to the reading overlay.

14. The non-transitory computer readable medium of claim 13, wherein the options overlay further responds to the forward transition gesture by playing a second audible announcement of the invoked command option.

\* \* \* \* \*